United States Patent
Zhang et al.

(10) Patent No.: US 9,338,031 B2
(45) Date of Patent: May 10, 2016

(54) METHODS AND APPARATUS FOR INTERFERENCE DECREASE/CANCELLATION ON DOWNLINK ACQUISITION SIGNALS

(75) Inventors: Xiaoxia Zhang, San Diego, CA (US); Durga Prasad Malladi, San Diego, CA (US); Yongbin Wei, San Diego, CA (US); Tao Luo, San Diego, CA (US); Hao Xu, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 858 days.

(21) Appl. No.: 12/857,195

(22) Filed: Aug. 16, 2010

(65) Prior Publication Data

US 2011/0195684 A1    Aug. 11, 2011

Related U.S. Application Data

(60) Provisional application No. 61/234,595, filed on Aug. 17, 2009.

(51) Int. Cl.
*H04W 4/00* (2009.01)
*H04L 25/02* (2006.01)
(Continued)

(52) U.S. Cl.
CPC .......... *H04L 25/0202* (2013.01); *H04B 1/7107* (2013.01); *H04J 11/004* (2013.01); *H04J 11/0069* (2013.01); *H04J 11/0093* (2013.01); *H04L 25/0224* (2013.01); *H04L 5/0023* (2013.01)

(58) Field of Classification Search
USPC .............. 455/63.1–65, 67.13, 296–312, 434; 375/346–351
See application file for complete search history.

(56) References Cited

U.S. PATENT DOCUMENTS 5,754,956 A * 5/1998 Abreu ................... H04W 48/16
455/434
6,192,067 B1 * 2/2001 Toda .................. H04B 1/71075
375/140

(Continued)

FOREIGN PATENT DOCUMENTS

EP    1241817 A1    9/2002
EP    1892865 A1    2/2008

(Continued)

OTHER PUBLICATIONS

3GPP: "3GPP TS 25.304 V7.7.0 (Sep. 2008), 3rd Generation Partnership Project, Technical Specification Group Radio Access Network, User Equipment (UE) procedures in idle mode and procedures for cell reselection in connected mode (Release 7)", Internet Citation, Sep. 1, 2008, pp. 1-41, XP002566164.

(Continued)

*Primary Examiner* — Edward Urban
*Assistant Examiner* — Rui Hu
(74) *Attorney, Agent, or Firm* — Nerrie M. Zohn

(57) ABSTRACT

A method, an apparatus, and a computer program product for receiving a signal including components from a plurality of cells, estimating a channel from the received signal using one or more channel estimation schemes, removing a component signal using the estimated channel from the received signal to generate a processed signal and detecting a residual signal in the processed signal.

59 Claims, 16 Drawing Sheets

(51) Int. Cl.
*H04B 1/7107* (2011.01)
*H04J 11/00* (2006.01)
*H04L 5/00* (2006.01)

(56) References Cited

U.S. PATENT DOCUMENTS

| | | | | |
|---|---|---|---|---|
| 6,496,534 B1* | 12/2002 | Shimizu | | H04B 1/71075 370/335 |
| 6,718,162 B1* | 4/2004 | Agin | | H04B 1/71075 370/342 |
| 6,775,252 B1* | 8/2004 | Bayley | | H04B 1/70754 370/328 |
| 6,807,405 B1* | 10/2004 | Jagger | | H04B 1/1036 370/318 |
| 7,058,002 B1* | 6/2006 | Kumagai | | H04L 27/2662 370/203 |
| 7,366,475 B2* | 4/2008 | Ramesh | | H04B 17/318 370/289 |
| 7,373,130 B2* | 5/2008 | Huss | | H04B 1/1027 375/346 |
| 7,430,419 B2* | 9/2008 | Gureshnik | | H04W 74/002 370/331 |
| 8,406,695 B2* | 3/2013 | Hou | | H04B 1/7103 370/209 |
| 8,446,869 B2* | 5/2013 | Lee | | H04W 56/0035 370/252 |
| 8,494,473 B2* | 7/2013 | Ozgun | | H04B 1/1036 455/283 |
| 8,504,029 B2* | 8/2013 | Axmon | | H04W 48/16 370/312 |
| 8,693,394 B2* | 4/2014 | Shin | | H04J 11/0093 370/328 |
| 8,767,708 B2* | 7/2014 | Krishnamurthy | | H04J 11/005 370/350 |
| 8,897,269 B2 | 11/2014 | Ji et al. | | |
| 8,983,511 B2* | 3/2015 | Koo | | H04B 7/022 455/501 |
| 2002/0154717 A1 | 10/2002 | Shima et al. | | |
| 2002/0159547 A1* | 10/2002 | Lindoff | | H04B 1/7105 375/343 |
| 2003/0012270 A1 | 1/2003 | Zhou et al. | | |
| 2003/0152167 A1* | 8/2003 | Oh | | H04B 1/70754 375/326 |
| 2004/0002813 A1 | 1/2004 | Silvester | | |
| 2004/0028013 A1 | 2/2004 | Fitton et al. | | |
| 2005/0107039 A1* | 5/2005 | Lindoff | | H04B 1/1027 455/63.1 |
| 2005/0111408 A1* | 5/2005 | Skillermark | | H04B 1/7105 370/331 |
| 2005/0120097 A1 | 6/2005 | Walton et al. | | |
| 2005/0152279 A1* | 7/2005 | Robertson | | H04W 52/241 370/252 |
| 2005/0195922 A1* | 9/2005 | Maeda | | H04L 25/03254 375/341 |
| 2005/0271026 A1* | 12/2005 | Song | | H04B 1/7083 370/342 |
| 2005/0272375 A1* | 12/2005 | Ramesh | | H04B 17/318 455/67.11 |
| 2005/0276314 A1* | 12/2005 | Dateki | | H04B 1/7107 375/148 |
| 2006/0141935 A1* | 6/2006 | Hou | | H04B 1/7103 455/63.1 |
| 2006/0234633 A1* | 10/2006 | Huss | | H04B 1/1027 455/63.1 |
| 2006/0251016 A1* | 11/2006 | Lee | | H04L 1/0021 370/329 |
| 2007/0121554 A1 | 5/2007 | Luo et al. | | |
| 2007/0237266 A1* | 10/2007 | Reial | | H04B 1/70755 375/341 |
| 2008/0037409 A1 | 2/2008 | Ogawa et al. | | |
| 2008/0043680 A1* | 2/2008 | Fitton | | H04B 1/7107 370/335 |
| 2008/0089403 A1* | 4/2008 | Hooli | | H04B 1/7097 375/232 |
| 2008/0120528 A1 | 5/2008 | Sawada | | |
| 2009/0028220 A1* | 1/2009 | Roh | | H04L 25/0216 375/136 |
| 2009/0088160 A1 | 4/2009 | Pani et al. | | |
| 2009/0116473 A1* | 5/2009 | Lindoff | | H04L 5/0007 370/350 |
| 2009/0196279 A1 | 8/2009 | Kim et al. | | |
| 2009/0202016 A1 | 8/2009 | Seong et al. | | |
| 2009/0323642 A1 | 12/2009 | Tanno et al. | | |
| 2009/0325578 A1* | 12/2009 | Li | | H04W 36/0055 455/436 |
| 2010/0003992 A1* | 1/2010 | Cao | | H04J 11/0076 455/446 |
| 2010/0074358 A1* | 3/2010 | Khojastepour | | H04L 25/0204 375/267 |
| 2010/0189058 A1* | 7/2010 | Kawamura | | H04L 5/0026 370/329 |
| 2010/0203866 A1* | 8/2010 | Li | | H04L 1/0045 455/411 |
| 2010/0223522 A1* | 9/2010 | Duggan | | H04L 1/0021 714/748 |
| 2010/0223524 A1* | 9/2010 | Duggan | | H04L 1/20 714/751 |
| 2010/0272034 A1 | 10/2010 | Imai et al. | | |
| 2010/0279638 A1* | 11/2010 | Lindoff | | H04L 25/0204 455/226.1 |
| 2010/0309861 A1 | 12/2010 | Gorokhov et al. | | |
| 2011/0033186 A1* | 2/2011 | Eichinger | | H04B 1/126 398/79 |
| 2011/0148689 A1* | 6/2011 | Filippi | | G01S 13/003 342/28 |
| 2012/0106530 A1* | 5/2012 | Drugge | | H04B 1/7083 370/338 |

FOREIGN PATENT DOCUMENTS

| | | |
|---|---|---|
| JP | 2000252960 A | 9/2000 |
| JP | 2003087219 A | 3/2003 |
| JP | 2007221743 A | 8/2007 |
| JP | 2007300384 A | 11/2007 |
| JP | 2008131363 A | 6/2008 |
| JP | 2008252418 A | 10/2008 |
| JP | 2009519670 A | 5/2009 |
| KR | 20080035498 A | 4/2008 |
| RU | 2137302 C1 | 9/1999 |
| RU | 2005139137 A | 5/2006 |
| WO | WO-9604738 A1 | 2/1996 |
| WO | 0232029 A1 | 4/2002 |
| WO | WO-2004102891 A1 | 11/2004 |
| WO | 2005055527 A1 | 6/2005 |
| WO | 2007073093 A2 | 6/2007 |
| WO | WO-2008044882 A1 | 4/2008 |
| WO | WO-2008127185 A1 | 10/2008 |
| WO | 2008144746 | 11/2008 |
| WO | 2008156417 A2 | 12/2008 |
| WO | 2009015365 A1 | 1/2009 |
| WO | WO-2009031966 A2 | 3/2009 |
| WO | 2009041069 A1 | 4/2009 |
| WO | 2009061084 A1 | 5/2009 |
| WO | 2009099810 A2 | 8/2009 |
| WO | 2009100212 | 8/2009 |
| WO | WO-2009095410 A2 | 8/2009 |

OTHER PUBLICATIONS

Benefits of Synchronization between Home eNB and macro eNB, 3GPP Draft, R2-082598, 3rd Generation Partnership Project (3GPP), Mobile Competence Centre, 650, Route Des Lucioles, F-06921 Sophia-Antipolis Cedex, France, vol. RAN WG2, No. Kansas City, USA, Apr. 30, 2008, XP050140259, [retrieved on Apr. 30, 2008].

ETRI: "Open-loop transmit diversity scheme for P-BCH using S-SCH", 3GPP Draft, R1-070747, 3rd Generation Partnership Project (3GPP), Mobile Competence Centre, 650, Route Des Lucioles, F-06921 Sophia-Antipolis Cedex, France, vol. RAN WGI, No. St. Louis, USA, Feb. 6, 2007, XP050104777, [retrieved on Feb. 6, 2007].

European Search Report—EP13150968—Search Authority—The Munich—Feb. 18, 2013.

(56) References Cited

OTHER PUBLICATIONS

European Search Report—EP13150970—Search Authority—Munich—Mar. 12, 2013.
European Search Report—EP13170367—Search Authority—Munich—Jun. 28, 2013.
Horng J H et al., "Capacity enhancement for hsdpa in w-cdma system", VTC 2002-Fall, 2002 IEEE 56th, Vehicular Technology Conference Proceedings, Vancouver, Canada, Sep. 24-28, 2002, [IEEE Vehicular Technolgy Conference], New York, NY : IEEE, US, vol. 2, Sep. 24, 2002, pp. 661-665, XP010608894, DOI:10.1109/VETECF.2002.1040681 ISBN: 978-0-7803-7467-6.
International Search Report and Written Opinion—PCT/US2010/045765, ISA/EPO—May 9, 2011.
Kopsa K., et al., "Multiuser Space-Time Algorithms for Synchronization, Channel Estimation and Data Detection in an Interference Monitoring System for UMTS/TDD Networks", IEEE Transactions on Communications, IEEE Service Center, Piscataway, NJ USA, vol. 55, No. 10, Oct. 1, 2007, pp. 1973-1983, XP011194612, ISSN: 0090-6778, DOI:10.1109/TCOMM.2007.906431.
LG Electronics: "CSG Flag in Physical Cell ID", 3GPP Draft, R1-082911_LGE_CSGFLAG_Final, 3rd Generation Partnership Project (3GPP), Mobile Competence Centre, 650, Route Des Lucioles, F-06921 Sophia-Antipolis Cedex, France, No. Jeju, Aug. 13, 2008, XP050316384, [retrieved on Aug. 13, 2008].
Nokia Siemens Networks: "Automatic Physical Cell ID Assignment", 3GPP Draft, S5-081185, 3rd Generation Partnership Project (3GPP), Mobile Competence Centre, 650, Route Des Lucioles, F-06921 Sophia-Antipolis Cedex, France, vol. SA WG5, No. Sophia Antipolis, France, Jul. 2, 2008, XP050307771, [retrieved on Jul. 2, 2008].
Nortel, "Further Evaluation of Tx Diversity Schemes for P-BCH" 3GPP Draft; R1-071448 (Nortel-BCH_Txd), 3rd Generation Partnership Project (3GPP), Mobile Competence Centre; 650, Route Des Lucioles; F-06921 Sophia-Antipolis Cedex; France, vol. RAN WG1, No. St. Julian; Mar. 20, 2007, XP050105385 p. 1-p. 3; table 1; p. 8.
Nortel: "Transmit Diversity for the Secondary Synchronization Channel", 3GPP Draft, R1-071446(N0rtel-Txd-SSCH), 3rd Generation Partnership Project (3GPP), Mobile Competence Centre, 650, Route Des Lucioles, F-06921 Sophia-Antipolis Cedex, France, vol. RAN WGI, No. St. Julian, Apr. 3, 2007, XP050105384, [retrieved on Apr. 3, 2007].
Scrambling of the Secondary Synchronization Signal, 3GPP Draft, R1-074374 {Secondary SCH} Generation Partnership Project (3GPP), Mobile Competence Centre, 650, Route Des Lucioles, F-06921 Sophia-Antipolis Cedex, France, vol. RAN WGI, No. Shanghai, China, Oct. 2, 2007, XP050107889, [retrieved on Oct. 2, 2007].
Taiwan Search Report—TW099127482—TIPO—Aug. 9, 2013.
Texas Instruments: "On the design of relay node for LTE-advanced", 3GPP Draft, R1-090593, 3rd Generation Partnership Project (3GPP), Mobile Competence Centre, 650, Route Des Lucioles, F-06921 Sophia-Antipolis Cedex, France, No. Athens, Greece, Feb. 3, 2009, XP050318480, [retrieved on Feb. 3, 2009].
TSG RAN WG4: "RSRP and RSRQ Definitions with Receiver Diversity", 3GPP Draft, R1-090557(R4-090413), 3rd Generation Partnership Project (3GPP), Mobile Competence Centre, 650, Route Des Lucioles, F-06921 Sophia-Antipolis Cedex, France, No. Athens, Greece, Jan. 27, 2009, XP050318451, [retrieved on Jan. 27, 2009].
Wu, C.C., et al., "Intercell interference cancellation for TD-CDMA mobile systems"Electronics Letters, IEE Stevenage, GB, vol. 36, No. 23, Nov. 9, 2000, pp. 1960-1961, XP006015935, ISSN: 0013-5194, DOI: DOI:10.1049/EL:20001381.
Grant P.M., et al., "Intercell Interference Cancellation for TD-CDMA Mobile System", The 11th IEEE International Symposium on Personal , Indoor and Mobile Radio Communications, 2000; PIMRC 2000, vol. 1, pp. 720-723.
Nagata S., et al., "Investigations of synchronization channel sequences in OFDM based evolved UTRA downlink," IEEE Vehicular Technology Conference, pp. 1390-1395, Oct. 2007.
Taiwan Search Report—TW099127482—TIPO—Aug. 16, 2014.

* cited by examiner

METHODS AND APPARATUS FOR INTERFERENCE DECREASE/CANCELLATION ON DOWNLINK ACQUISITION SIGNALS

CROSS-REFERENCE TO RELATED APPLICATION(S)

This application claims the benefit of U.S. Provisional Application Ser. No. 61/234,595 entitled "INTERFERENCE CANCELLATION ON DOWNLINK ACQUISITION SIGNALS," filed Aug. 17, 2009, which is expressly incorporated by reference herein in its entirety.

BACKGROUND

1. Field

The present disclosure relates generally to communication systems, and more particularly, to methods and apparatus for interference decrease or cancellation on downlink acquisition signals.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method of wireless communication includes the estimation of a channel from a received signal using one or more channel estimation schemes, the removal of a component signal using the estimated channel from the received signal to generate a processed signal, and the detection of a residual signal in the processed signal.

In another aspect of the disclosure, an apparatus for wireless communication includes a means for receiving a signal including components from a plurality of cells, a means for estimating a channel from the received signal using one or more channel estimation schemes, a means for removing a component signal using the estimated channel from the received signal to generate a processed signal, and a means for detecting a residual signal in the processed signal.

In yet another aspect of the disclosure, a computer program product includes a computer-readable medium comprising code to estimate a channel from a received signal using one or more channel estimation schemes, to remove a component signal using the estimated channel from the received signal to generate a processed signal, and to detect a residual signal in the processed signal.

In yet another aspect of the disclosure, an apparatus for wireless communication includes at least one processor, and a memory coupled to the at least one processor, wherein the at least one processor is configured to estimate a channel from a received signal using one or more channel estimation schemes, remove a component signal using the estimated channel from the received signal to generate a processed signal, and detect a residual signal in the processed signal.

DETAILED DESCRIPTION

Figure 1:
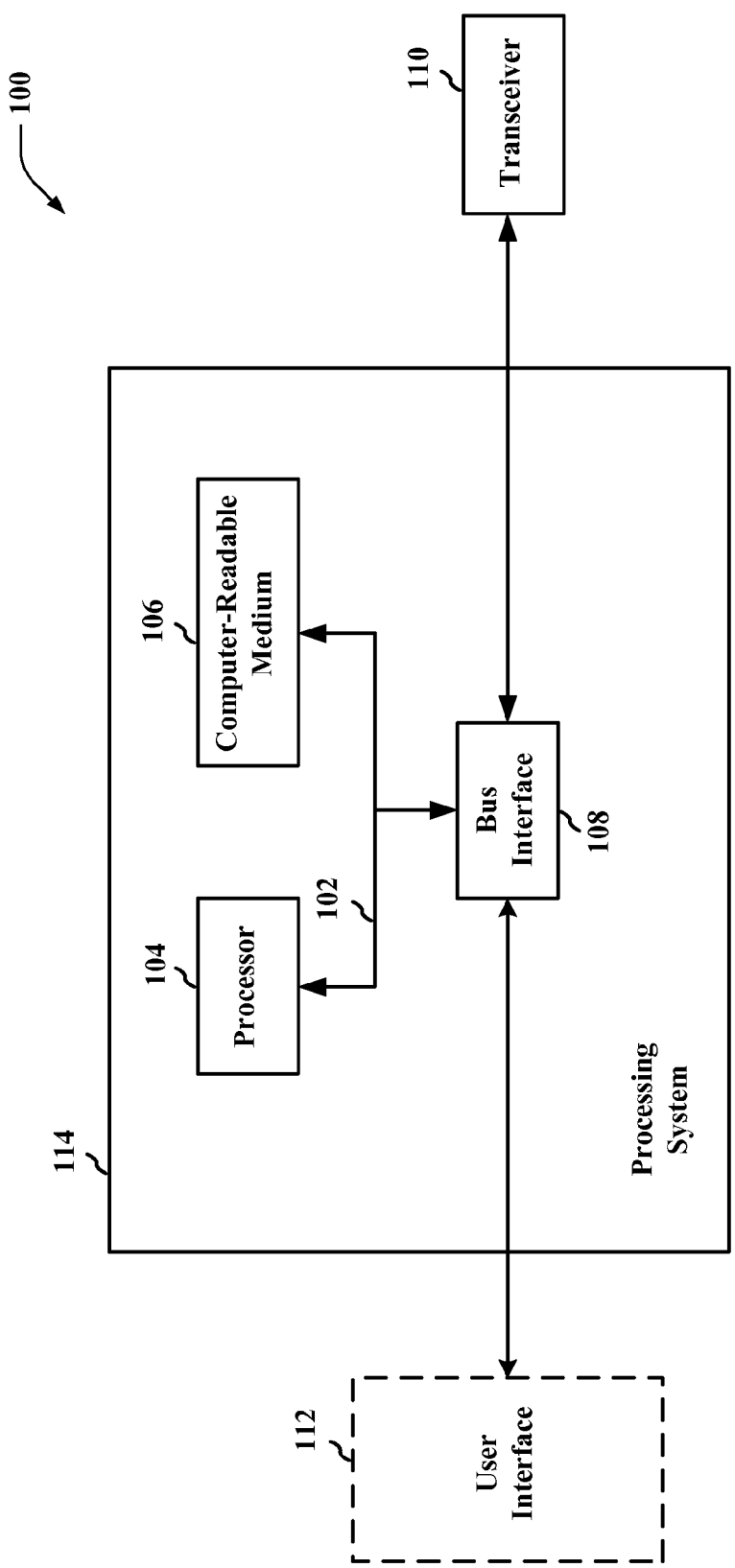
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
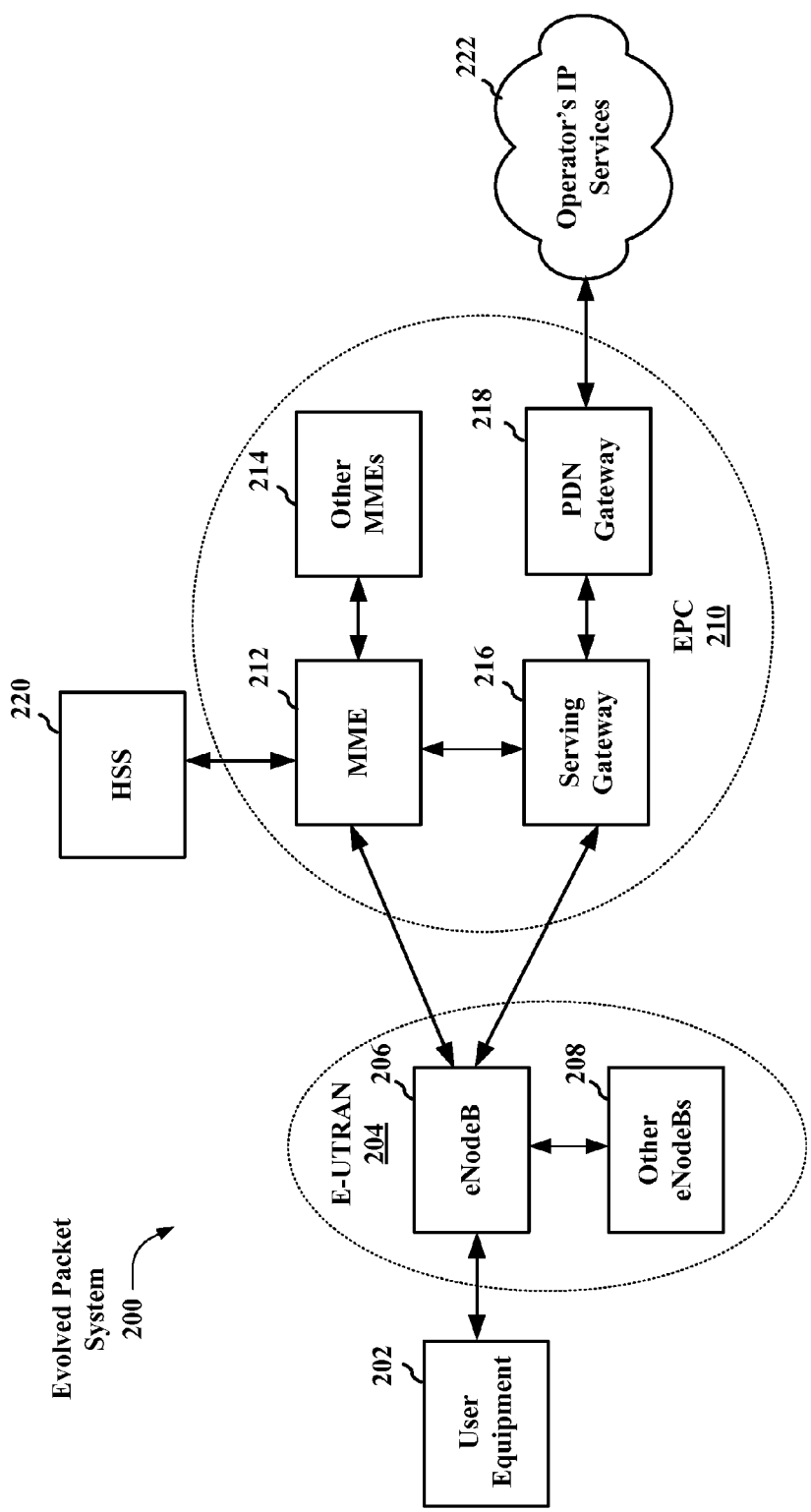
FIG. 2 is a diagram illustrating an example of a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
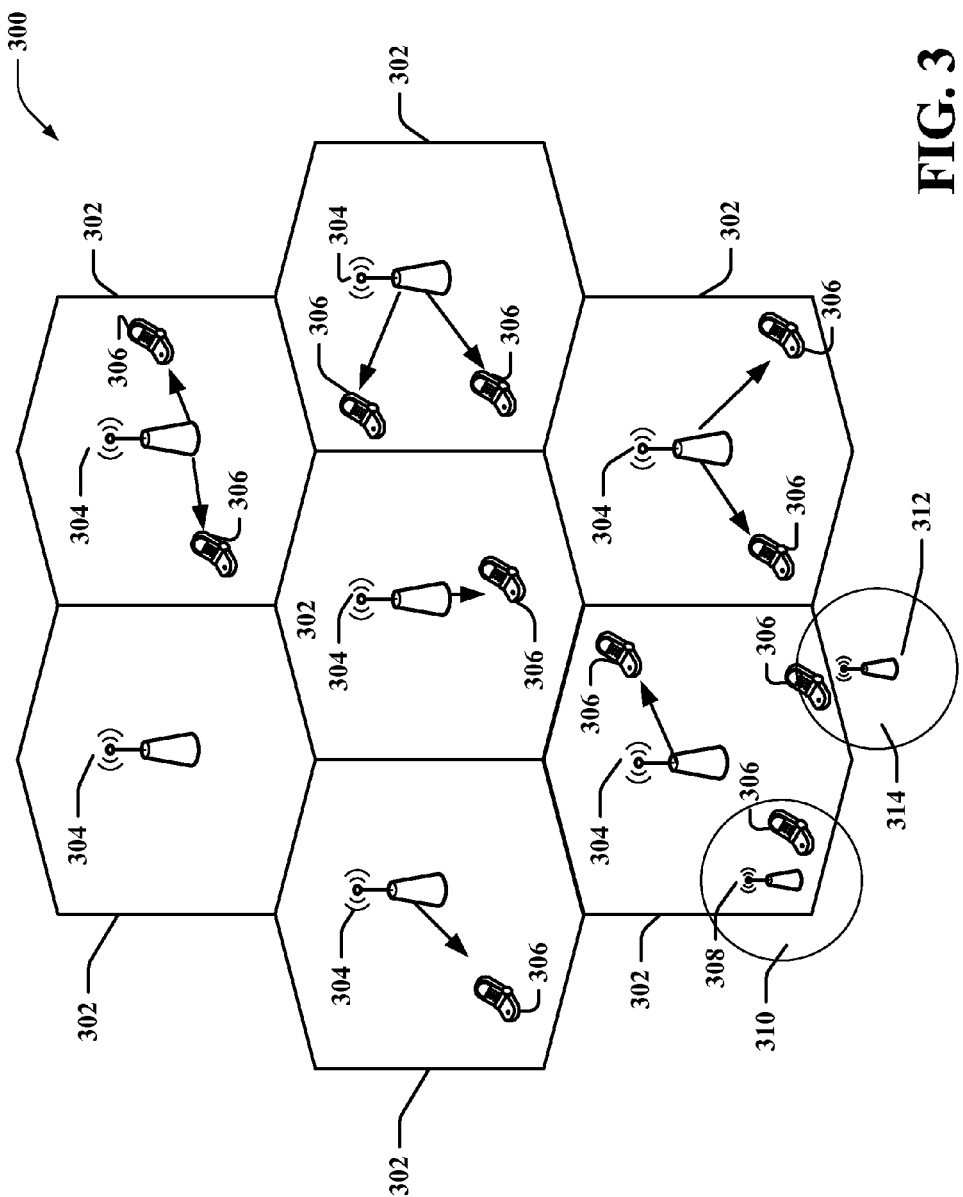
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
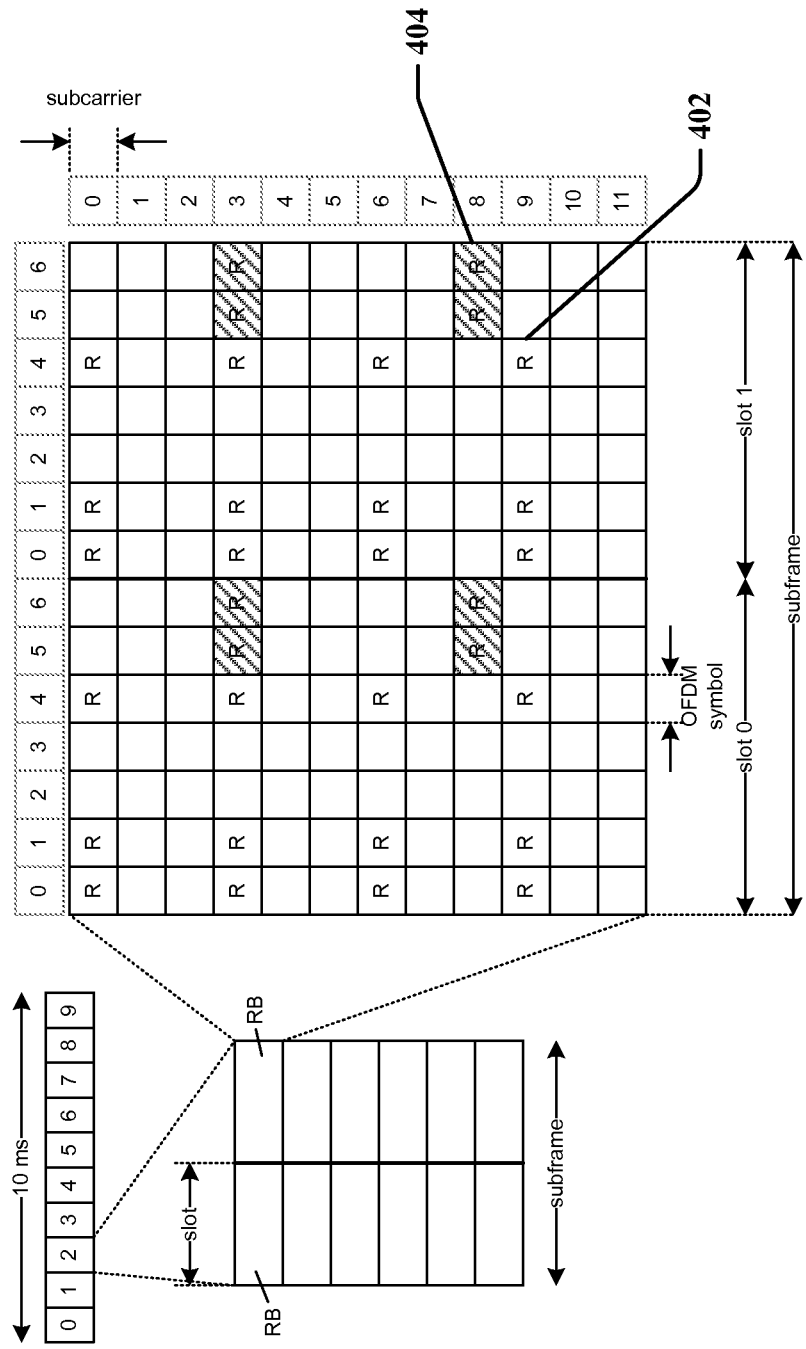
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
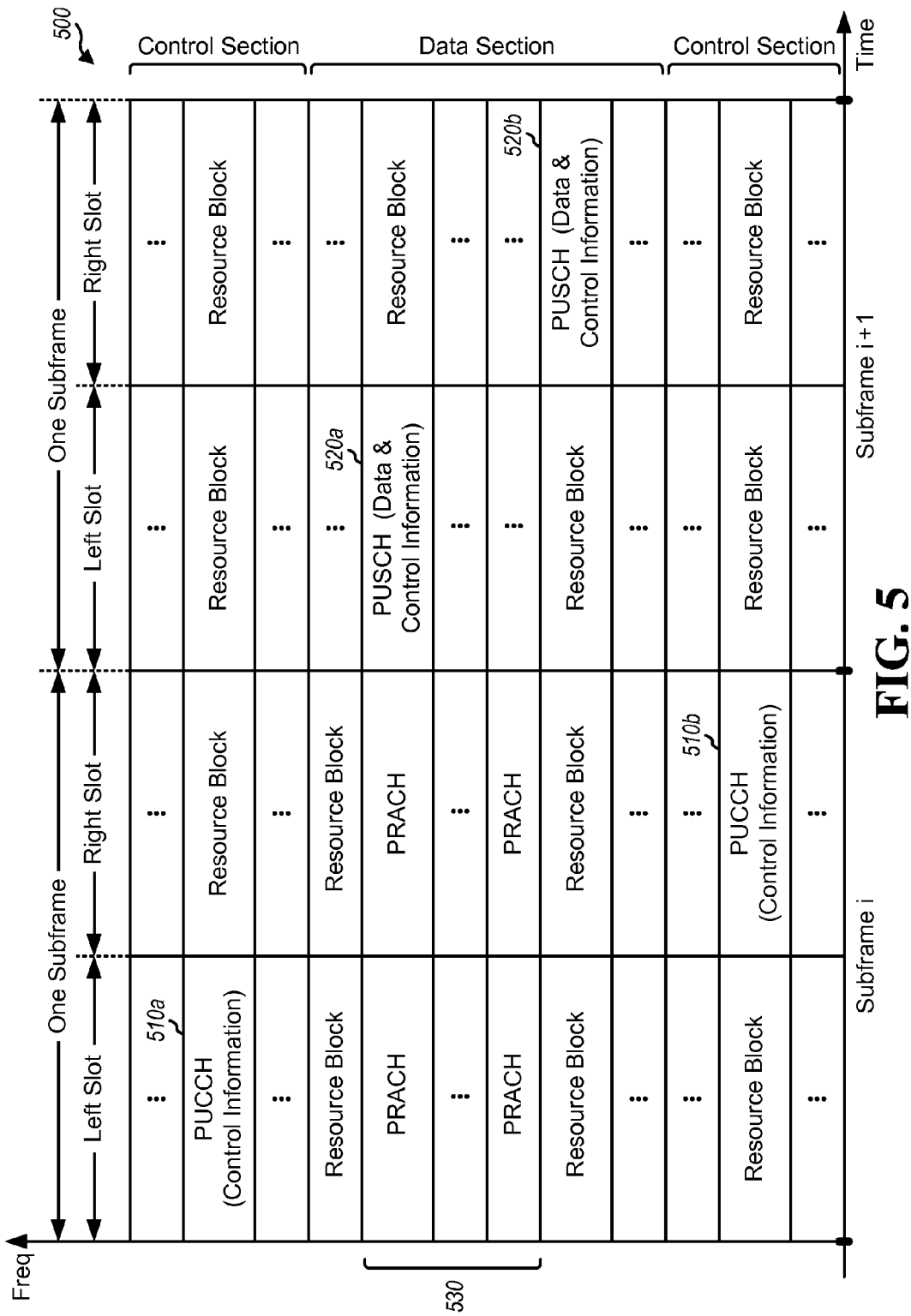
FIG. 5 shows an exemplary format for the UL in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA): Physical Channels and Modulation," which is publicly available.

Figure 6:
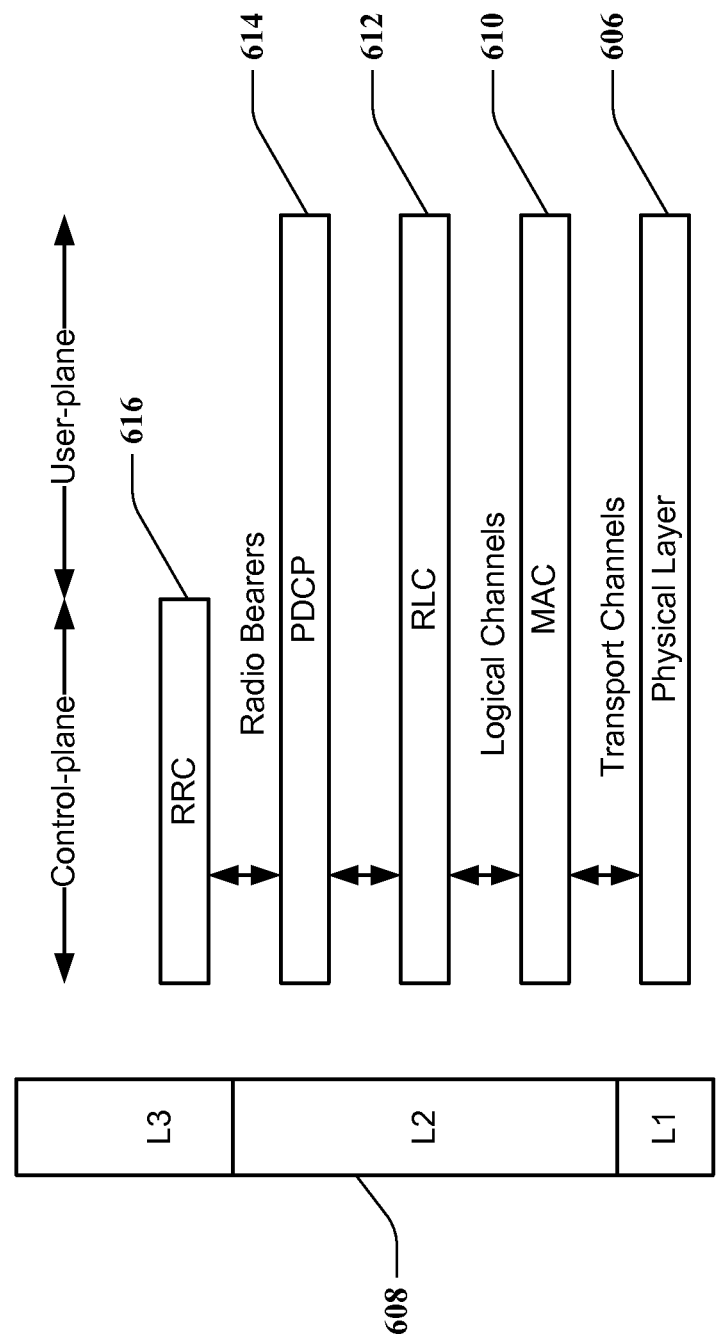
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
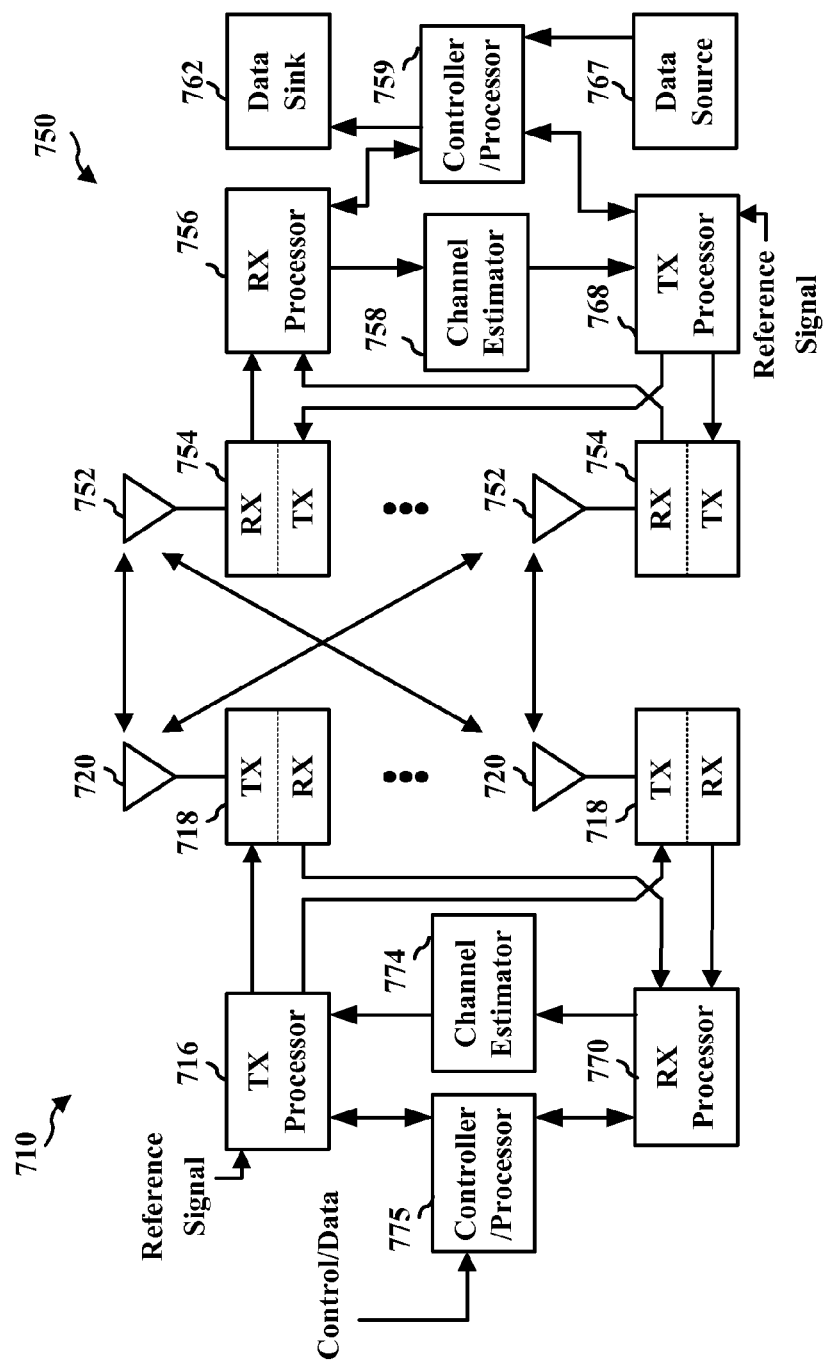
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations.

The processing system 114 described in relation to FIG. 1 may include eNB 710. In particular, the processing system 114 may include the TX processor 716, the RX processor 770, and the controller/processor 775. The processing system 114 described in relation to FIG. 1 may include UE 750. In particular, the processing system 114 may include the TX processor 768, the RX processor 756, and the controller/processor 759.

Figure 8:
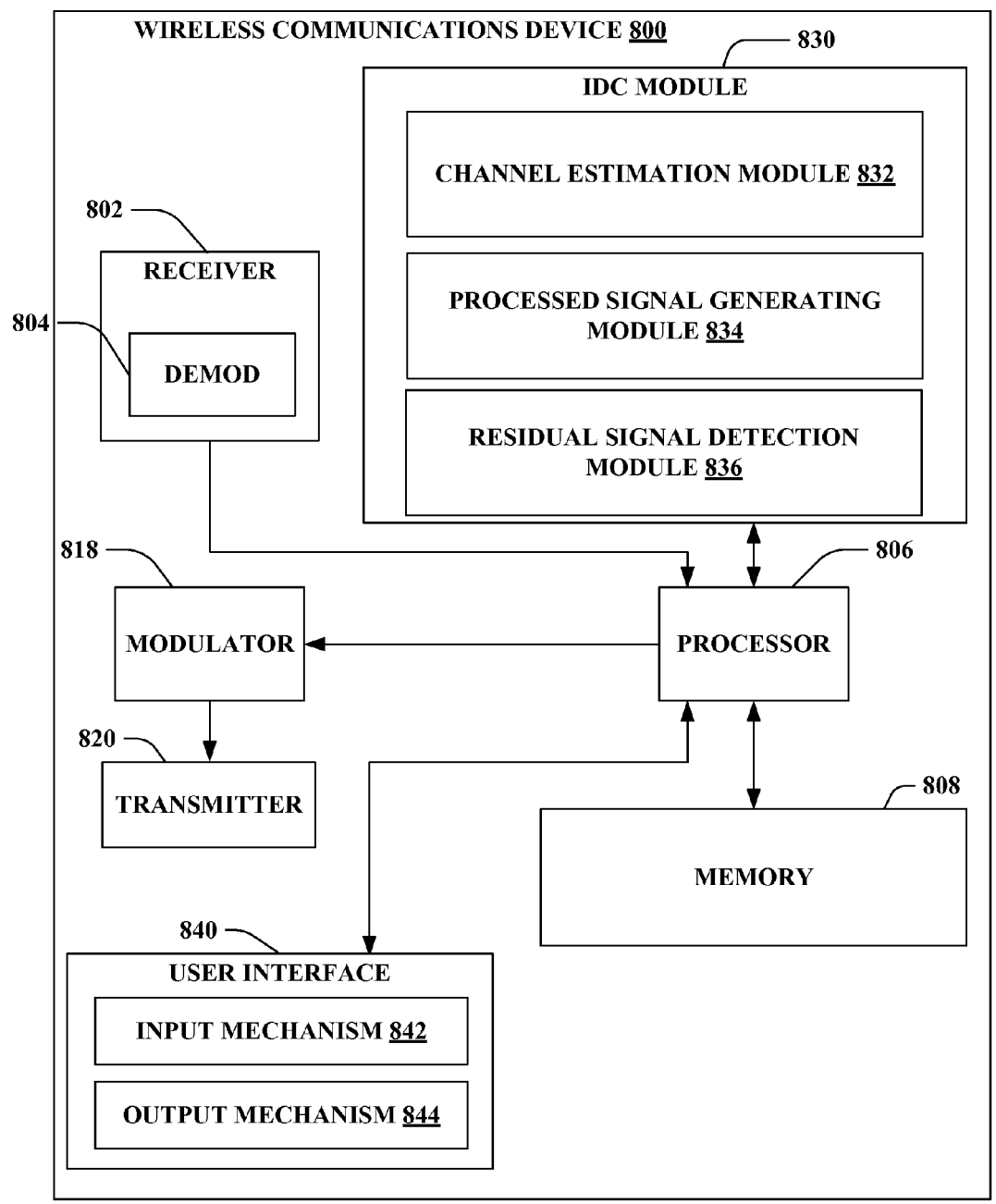
FIG. 8 is a block diagram example architecture of a wireless communications device.

Turning now to FIG. 8, an example wireless communications device (WCD) 800 is illustrated. As depicted in FIG. 8, WCD 800 may include receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to processor 806 for channel estimation. Processor 806 can be a processor dedicated to analyzing information received by receiver 802 and/or generating information for transmission by transmitter 820, a processor that controls one or more components of WCD 800, and/or a processor that both analyzes information received by receiver 802, generates information for transmission by transmitter 820, and controls one or more components of WCD 800.

WCD 800 can additionally comprise memory 808 that is operatively coupled to processor 806 and that can store data to be transmitted, received data, information related to available channels, data associated with an analyzed signal and/or an interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

Further, processor 806 can provide means for receiving a signal including components from a plurality of cells, estimating a channel from the received signal using one or more channel estimation schemes, removing a component signal using the estimated channel from the received signal to generate a processed signal and detecting a residual signal in the processed signal.

It will be appreciated that the memory 808 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 808 of the subject systems and methods may comprise, without being limited to, these and any other suitable types of memory.

WCD 800 can further include interference decrease/cancellation (IDC) module 830 to facilitate interference decrease or cancellation for a WCD 800 on downlink acquisition signals. In one aspect, IDC module 830 may include channel estimation module 832, processed signal generating module 834 and residual signal detection module 836. In one aspect, channel estimation module 832 may be operable to estimate a channel from a received signal using one or more channel estimation schemes. In one aspect, processed signal generating module 834 may be operable to remove a component signal using the estimated channel generated by the channel estimation module 832 from the received signal to generate a processed signal. In one aspect, residual signal detection module 836 may be operable to detect a residual signal in the processed signal.

Additionally, WCD 800 may include user interface 840. User interface 840 may include input mechanisms 842 for generating inputs into WCD 800, and output mechanism 844 for generating information for consumption by the user of the WCD 800. For example, input mechanism 842 may include a mechanism such as a key or keyboard, a mouse, a touchscreen display, a microphone, etc. Further, for example, output mechanism 844 may include a display, an audio speaker, a haptic feedback mechanism, a Personal Area Network (PAN) transceiver, etc. In the illustrated aspects, the output mechanism 844 may include a display operable to present media content that is in image or video format or an audio speaker to present media content that is in an audio format.

Figure 9:
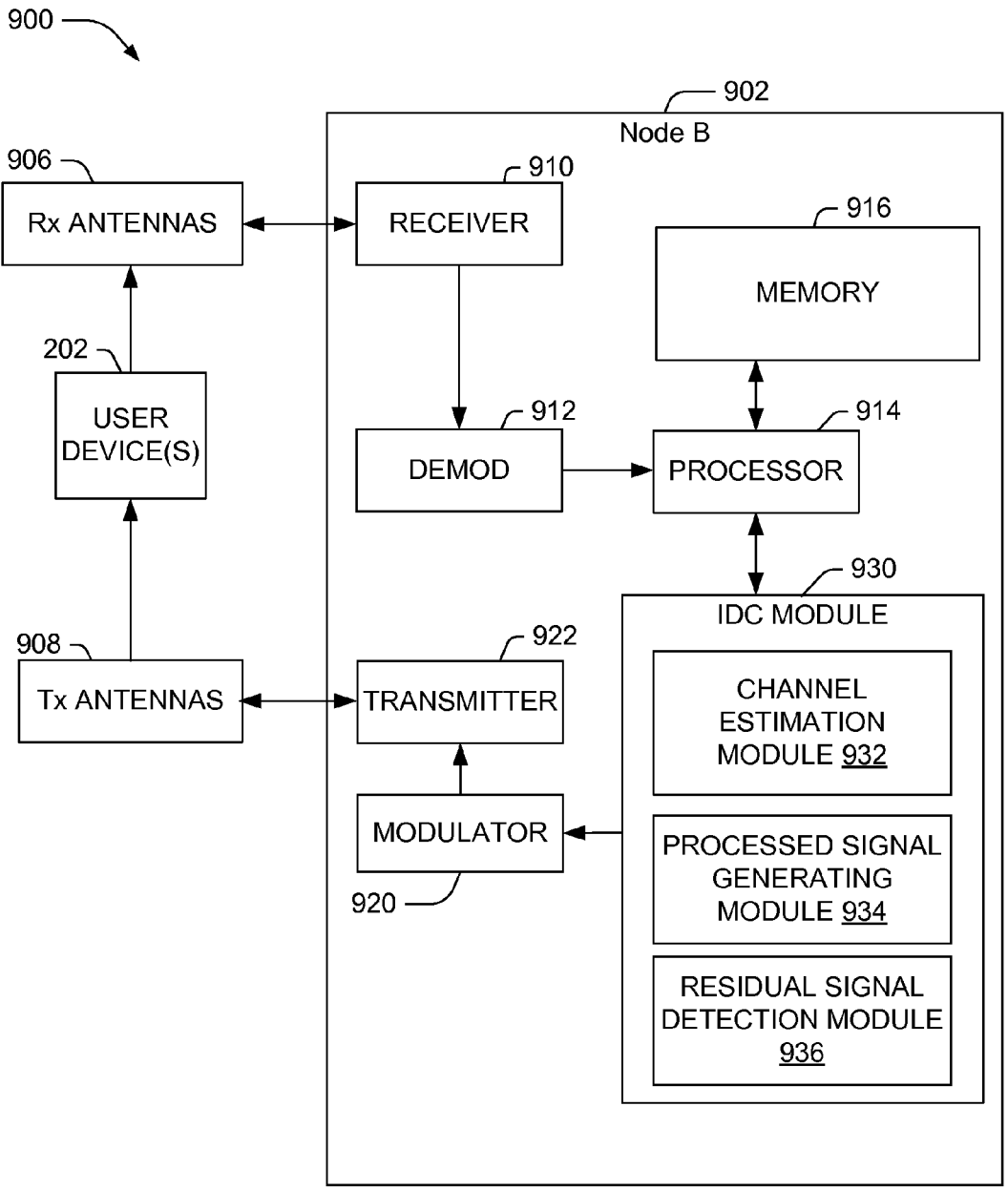
FIG. 9 is a block diagram depicting an exemplary architecture of a NodeB configured for interference decrease/cancellation according to an aspect.

With reference to FIG. 9, an example system 900 that may include an eNodeB 902 with a receiver 910 that receives signal(s) from one or more user devices 202 through a plurality of receive antennas 906, and a transmitter 922 that transmits to the one or more user devices 202 through a plurality of transmit antennas 908. Receiver 910 can receive information from receive antennas 906 and is operatively associated with a demodulator 912 that demodulates received information. Demodulated symbols are analyzed by a processor 914, and which is coupled to a memory 916 that stores, among other items, information related to mobile device performance measurements and location. Processor 914 can be a processor dedicated to analyzing information received by receiver 910 and/or generating information for transmission by a transmitter 922, a processor that controls one or more components of base station 902, and/or a processor that both analyzes information received by receiver 910, generates information for transmission by transmitter 922, and controls one or more components of base station 902. As noted above, base station 902 can additionally comprise memory 916 that is operatively coupled to processor 914 and that stores, among other items, information related to mobile device performance measurements and location. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 916 of the subject apparatus and methods is intended to comprise, without being limited to, these and any other suitable types of memory.

Processor 914 is further coupled to interference decrease/cancellation (IDC) module 930 to facilitate interference decrease or cancellation for a WCD 900 on downlink acquisition signals. In one aspect, IDC module 930 may include channel estimation module 932, processed signal generating module 934 and residual signal detection module 936. In one aspect, channel estimation module 932 may be operable to estimate a channel from a received signal using one or more channel estimation schemes. In one aspect, processed signal generating module 934 may be operable to remove a component signal using the estimated channel generated by the channel estimation module 932 from the received signal to generate a processed signal. In one aspect, residual signal detection module 936 may be operable to detect a residual signal in the processed signal.

Figure 10:
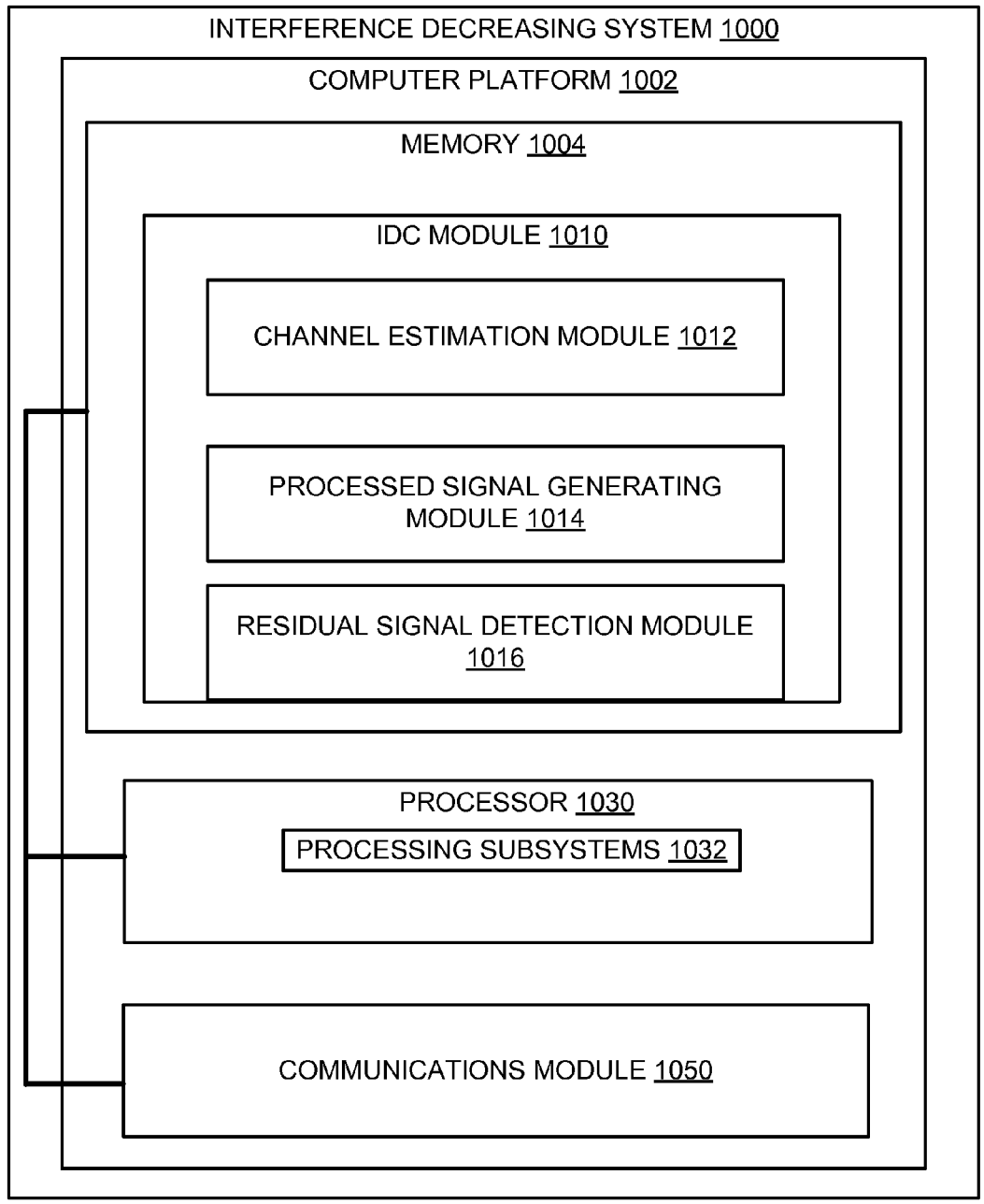
FIG. 10 illustrates exemplary block diagram of an interference decreasing system according to an aspect.

With reference to FIG. 10, illustrated is a detailed block diagram of interference decreasing system 1000, such as MME 212 depicted in FIG. 2. Interference decreasing system 1000 may comprise at least one of any type of hardware, server, personal computer, mini computer, mainframe computer, or any computing device either special purpose or general computing device. Further, the modules and applications described herein as being operated on or executed by interference decreasing system 1000 may be executed entirely on a single network device, as shown in FIG. 2, or alternatively, in other aspects, separate servers, databases or computer devices may work in concert to provide data in usable formats to parties, and/or to provide a separate layer of control in the data flow between communications device 202 and the modules and applications executed by interference decreasing system 1000.

Interference decreasing system 1000 includes computer platform 1002 that can transmit and receive data across wired and wireless networks, and that can execute routines and applications. Computer platform 1002 includes memory 1004, which may comprise volatile and nonvolatile memory such as read-only and/or random-access memory (ROM and RAM), EPROM, EEPROM, flash cards, or any memory common to computer platforms. Further, memory 1004 may include one or more flash memory cells, or may be any secondary or tertiary storage device, such as magnetic media, optical media, tape, or soft or hard disk. Further, computer platform 1002 also includes processor 1030, which may be an application-specific integrated circuit ("ASIC"), or other chipset, logic circuit, or other data processing device. Processor 1030 may include various processing subsystems 1032 embodied in hardware, firmware, software, and combinations thereof, that enable the functionality of media content distribution system and the operability of the network device on a wired or wireless network.

Computer platform 1002 further includes communications module 1050 embodied in hardware, firmware, software, and combinations thereof, that enables communications among the various components of interference decreasing system 1000, as well as between interference decreasing system 1000, devices 202 and eNodeBs 206. Communication module 1050 may include the requisite hardware, firmware, software and/or combinations thereof for establishing a wireless communication connection. According to described aspects, communication module 1050 may include the necessary hardware, firmware and/or software to facilitate wireless broadcast, multicast and/or unicast communication of requested content items, control information, applications, etc.

Memory 1004 of interference decreasing system 1000 includes IDC module 1010 operable to facilitate interference decrease or cancellation for a system on downlink acquisition signals. In one aspect, IDC module 1010 may include channel estimation module 1012, processed signal generating module 1014 and residual signal detection module 1016. In one aspect, channel estimation module 1012 may be operable to estimate a channel from a received signal using one or more channel estimation schemes. In one aspect, processed signal generating module 1014 may be operable to remove a component signal using the estimated channel generated by the channel estimation module 1012 from the received signal to generate a processed signal. In one aspect, residual signal detection module 1016 may be operable to detect a residual signal in the processed signal.

Figure 11:
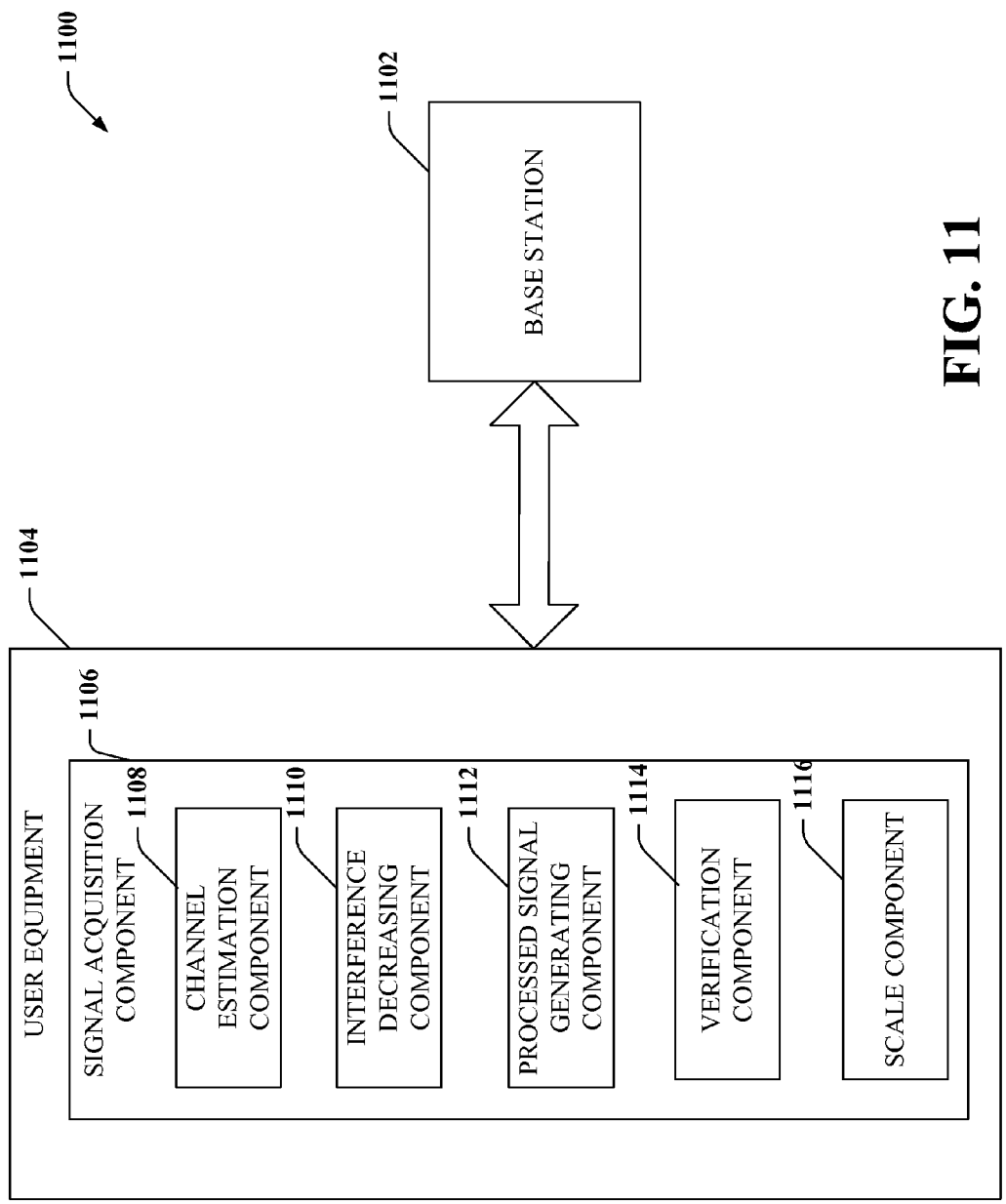
FIG. 11 is a block diagram of an example system that facilitates interference cancellation in accordance with one aspect of the subject disclosure.

FIG. 11 illustrates an example system 1100 that facilitates interference cancellation, decrease or removal on acquisition signals using a base station and a user equipment, where the cancellation or decrease is performed on the user equipment. The system 1100 may include a number of different components such as, for example, a base station 1102 (e.g., access point, Node B, eNode B, eNB or other suitable device) that can communicate with user equipment 1104 (UE). The user equipment may, for example, take the form of a mobile station, mobile device, and any other suitable device discussed herein and/or any number of suitable devices. The base station 1102 can transmit information to the user equipment 1104 in a variety of different ways, such as, for example, over a forward link channel or downlink channel. Further, base station 1102 can receive information from the user equipment 1104 over at least a reverse link channel or uplink channel.

System 1100 can operate under a number of different arrangements. For example, System 1100 can be a MIMO system. Additionally, System 1100 can operate in an OFDMA wireless network. Examples of suitable OFDMA wireless networks include 8GPP, 8GPP2, 8GPP, and LTE, among others.

The user equipment 1104 can include a Signal Acquisition Component 1106 that can, for example, facilitate acquisition of downlink signals from the base station 1102. Herein the terms "strong cell," "stronger cell" and "strongest cell" will denote, respectively, cells with strong, stronger or strongest signals. The terms "weak cell," "weaker cell" and "weakest cell" will denote, respectively, cells with weak, weaker or weakest signals. In a homogeneous network, the user equipment 1104 may, for example, search for a serving cell from downlink acquisition signals, and choose or use as the serving cell the cell that has the strongest signal. In a heterogeneous network, on the other hand, the strongest cells may not be accessible to the user equipment 1104 and as such, the user equipment 1104 may need to search for a serving cell that is significantly weaker than the strongest cell. In these and other situations, detection of a cell from primary synchronization signal (PSS) and/or secondary synchronization signal (SSS) may not be sufficiently reliable. Falsely detected cells from such a method could result in degraded IC performance. Moreover, it is possible that the signal after interference cancellation may be too weak and/or susceptible to other cell data interference even in cases in which the timing between cell signals is off. Actual implementation may require more bandwidth. There are also performance issues when cells have the same PSS ID.

The Signal Acquisition Component 1106 may include, for example, an Interference Decreasing Component 1110, a Channel Estimation Component 1108 and a Processed Signal Generating Component 1112. Each of the Interference Decreasing Component 1110, Channel Estimation Component 1108 and Processed Signal Generating Component 1112 may be used together, for example, to remove or to decrease interference in the received signal, to remove a component signal using the estimated channel from the received signal, to generate a processed signal, and to generate or to detect a residual signal in the processed signal. The Processed Signal Generating Component 1112 generates processed and/or other signals once they have been so obtained. The Processed Signal Generating Component 1112 may perform additional processing on signals such as, for example, filtering, scaling or manipulating the signals.

Interference Decreasing Component 1110 may cancel, remove, or decrease interference from other cells so that the user equipment 1104 can access a weaker serving cell. The cancellation, removal, or decreasing of signals from interfering cells by the Interference Decreasing Component 1110 can, for example, be a function of a channel estimate or channel estimates provided to the Interference Decreasing Component 1110 by the Channel Estimation Component 1108 through channel estimation. Channel estimation, which can be useful in interference cancellation, decrease, or removal, is a process, among other things, of characterizing the effect of a channel on a signal. Channel estimation can be especially helpful in reducing interference from residual signals from strong cells.

The Channel Estimation Component 1108 can employ various mechanisms/methods in order to perform a channel estimation. In accordance with one variation, for example, the Channel Estimation Component 1108 may use a detected PSS to estimate the channel. Such a channel estimation can subsequently be used to reconstruct the strong cell signals, which can then be used to cancel out the strong cell signal. Using the PSS for channel estimation can be beneficial because, among other reasons, the PSS is usually readily available in an initial cell search when coherent SSS detection is performed. However, the PSS can have a single frequency network (SFN) effect, particularly when there are only three PSSs in a system as multiple eNBs may share the same PSS.

In another variation, the Channel Estimation Component 1108 may use a detected SSS to estimate the channel. There can be a large number of SSSs per system (e.g., there may be as much or more as one hundred and sixty-eight SSSs in a particular system). Because of the large number of SSSs, the SFN effect can be lower when SSSs are used to estimate the channel than when PSSs are used to estimate the channel. This is because the likelihood of any two eNBs sharing the same SSS in considerably less likely, than the likelihood of any two eNBs sharing the same PSS.

In another variation, the Channel Estimation Component 1108 may perform a reference signal (RS) based channel estimate. More specifically, the user equipment 1104 can acquire a strong cell and use RS symbols corresponding to the strong cell to obtain a channel estimate. In this variation, RS symbols can be wideband and may include adjacent multiple subframes. Combining RS symbols across multiple subframes can depend upon the presence of a multimedia broadcast unicast single frequency network (MBSFN) or on a blank subframe.

A MBSFN subframe may include a control region and a data region. In one aspect, the data region may be allocated no data for transmission, and as such the data portion of the MBSFN subframe may resemble a blank subframe. Further, a blank subframe may refer to a subframe in which no transmissions occur. In this and other cases, the presence of MBSFN/blank subframe can be obtained or ascertained from a system information block (SIB). With MBSFN subframes, RS within the first two symbols in the control region can be combined to assist in estimating the channel. Furthermore, blank subframes can be skipped.

Differences in the implementation of performing a RS based channel estimates can exist between single and multiple antenna systems. For example, in a single antenna system RS based channels can be used directly. Alternatively, for a multiple transmit antenna system, PSS/SSS may use precoding vector steering (PVS) to allow a UE to determine transmission phases and properly decode the transmission. By contrast, an RS based approach does not use PVS. In particular, a precoding vector may be linked to a system frame number (SFN) or other quantity. Further, an RS based channel estimate can be multiplied with a precoding vector to obtain the channel for PSS/SSS.

In accordance with yet another variation, the Channel Estimation Component 1108 can perform physical broadcast channel (PBCH) aided channel estimation. In this variation, the user equipment 1104 may decode strong cell's PBCH and use the decoded PBCH to perform or enhance channel estimation. The decoded strong cell PBCH may also be used to reduce the likelihood of false alarms. The term "false alarm" refers to, among other things, the misidentification as to whether or not a detected cell truly exists.

Implementations for performing physical broadcast channel (PBCH) aided channel estimates can differ between single and multiple antenna systems. In a single antenna system, for example, a physical channel signal estimated from a PBCH can be directly applied to PSS/SSS. For multiple antenna systems, on the other hand, the physical channel estimated from a PBCH can be multiplied with a precoding vector to obtain the channel applied to PSS/SSS.

The Signal Acquisition Component 1106 can also include a Verification Component 1114 to reduce false alarms. In one variation, the Verification Component 1114 may reduce false alarms or perform verification based on a reference signal received power (RSRP) measurement. This can be done, for example, by comparing RSRP with a number of quantities. For example, the Verification Component 1114 may compare RSRP with a threshold, such as an absolute or pre-defined or defined threshold value. Verification Component 1114 may compare RSRP with a relative threshold generated from a detected strongest cell, and/or a threshold generated from an average of multiple detected cells. This variation is beneficial in that an RSRP measurement is already required, for example in Rel-8. Further, the variation method improves reliability. However, RSRP measurement/thresholding can involve or even necessitate a time average. This may result in increased search times.

According to another variation, the Verification Component 1114 can reduce false alarms or perform verification based on PBCH decoding. In this variation, for example, the presence of a cell can be confirmed by performing a cyclic redundancy check (CRC) on the residual signal. Since PBCH has a sixteen-bit CRC, this CRC can give a reliable indication of a valid cell. Additionally, detection time for the CRC is shorter than RSRP measurement and average. Generally, user equipment 1104 may need to decode PBCH for many or even all neighbor cells.

In yet another variation, the Verification Component 1114 can combine verification based on RSRP measurement with verification based on PBCH decoding. For example, PBCH can be decoded for only those cells where RSRP passes a certain threshold. Among other things, this variation results in good reliability and reduced complexity/power consumption. Moreover, RSRP does not necessarily require long average length.

Scale Component 1116 of the Signal Acquisition Component 1106 and user equipment 1104 can perform signal scaling to improve weak residual signals and/or increase their detectability. The residual signal obtained from cancelling or decreasing strong interference can be relatively weak, compared to detection capabilities. Consequently, a large bit width may be needed to handle, use or interpret the weak signal. In addition, when a system is not strictly synchronous, interpreting a weak signal can be made more difficult by the presence of data from strong cell(s), which are not easy to cancel, decrease or eliminate. In response, Scale Component 1116 can perform automatic gain control (AGC) after cancellation. AGC can be used, for example, to increase residual signal strength (e.g., to increase signal strength after interference cancellation, removal or decrease) such that the residual signal reaches similar levels as the received signal. Such scaling can be, for example, based on an estimated channel from the Channel Estimation Component 1108 and/or the energy differences between the received signal and residual signal, among other things.

UE 1104 may also be configured to acquire signals and decrease interference when strong and weak cells have the same PSS. In this situation, errors in channel estimation may partially or effectively cancel the desired PSS. Careful planning can address this situation where all femto eNBs around a macro use a different PSS from the macros, for instance. Another option is to store information associated with the estimated channel and a detected timing to allow the UE to distinguish between multiple similar estimated channels.

Figure 12:
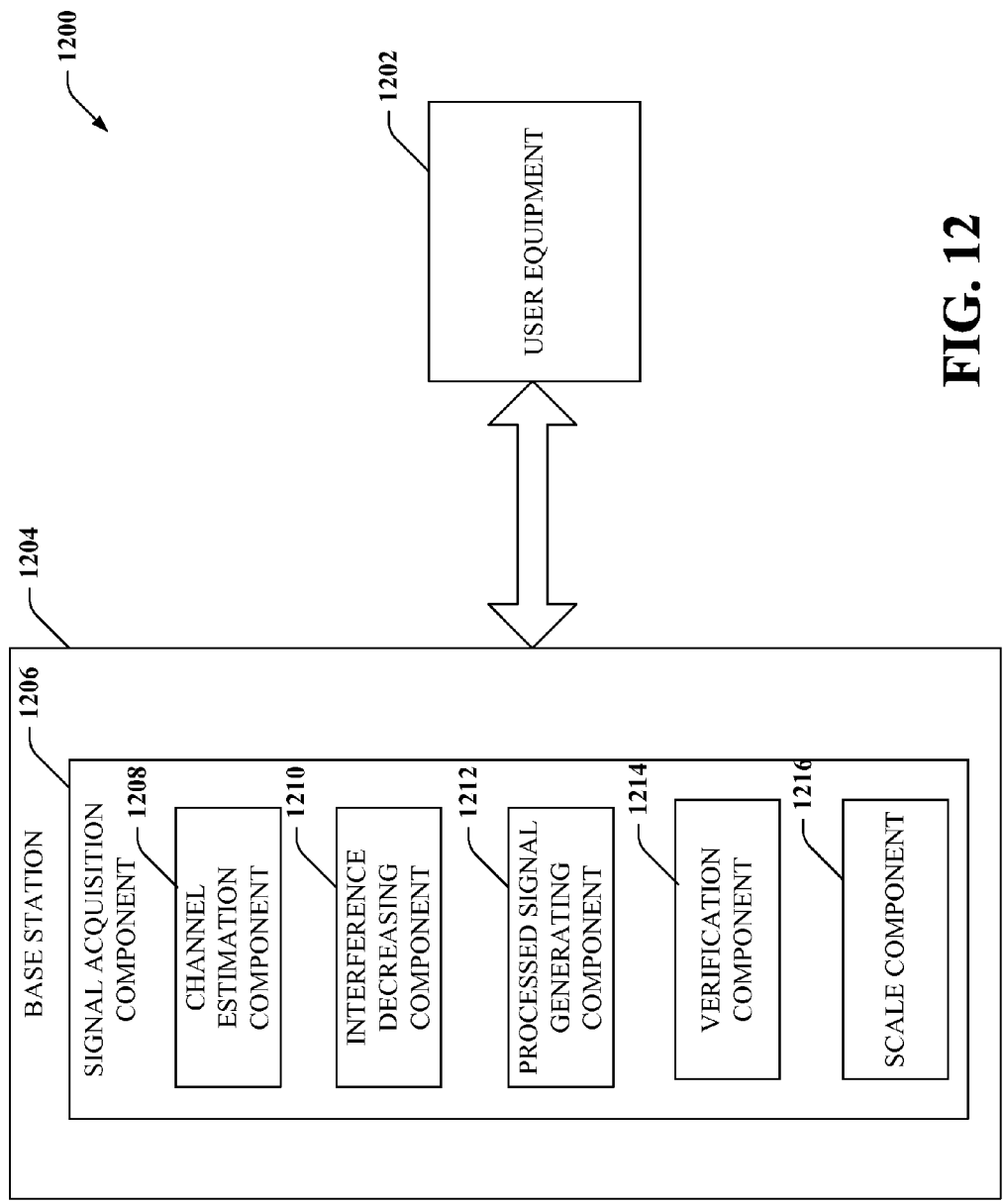
FIG. 12 is another block diagram of an example system that facilitates interference cancellation in accordance with one aspect of the subject disclosure.

FIG. 12 illustrates an example system 1200 that facilitates interference cancellation, decrease or removal on acquisition signals using a base station and a user equipment, where the cancellation or decrease is performed on the base station. It is to be understood that the components and functionalities shown and described below in the base stations 1102, 1204 can be present in the user equipments 1104, 1202 and vice versa.

The system 1200 may include a number of different components such as, for example, a base station 1204 (e.g., access point, Node B, eNode B, eNB or other suitable device) that can communicate with user equipment 1202 (UE). The user equipment may, for example, take the form of a mobile station, mobile device, and any other suitable device discussed herein and/or any number of suitable devices. The base station 1204 can transmit information to the user equipment 1202 in a variety of different ways, such as, for example, over a forward link channel or downlink channel. Further, base station 1204 can receive information from the user equipment 1202 over, at least, a reverse link channel or uplink channel.

System 1200 can operate under a number of different arrangements. For example, System 1100 can be a MIMO system. Additionally, System 1200 can operate in an OFDMA wireless network. Examples of suitable OFDMA wireless networks include 8GPP, 8GPP2, 8GPP, and LTE, among others.

The base station 1204 can include a Signal Acquisition Component 1206 that can, for example, facilitate acquisition of downlink signals. Herein the terms "strong cell," "stronger cell" and "strongest cell" will denote, respectively, cells with strong, stronger or strongest signals. The terms "weak cell," "weaker cell," and "weakest cell" will denote, respectively, cells with weak, weaker, or weakest signals. In a homogeneous network, the base station 1204 may, for example, search for a serving cell from downlink acquisition signals, and choose or use as the serving cell the cell that has the strongest signal. In a heterogeneous network, on the other hand, the strongest cells may not be accessible to the base station 1204 and as such, the base station 1204 may need to search for a serving cell that is significantly weaker than the strongest cell. In these and other situations, detection of a cell from PSS and/or SSS may not be sufficiently reliable. Falsely detected cells from such a method could result in degraded IC performance. Moreover, it is possible that the signal after interference cancellation may be too weak and/or susceptible to other cell data interference even in cases in which the timing between cell signals is off. Actual implementation may require more bandwidth. There are also performance issues when cells have the same PSS ID.

The Signal Acquisition Component 1206 may, for example, an Interference Decreasing Component 1210, a Channel Estimation Component 1208 and a Processed Signal Generating Component 1212. Each of the Interference Decreasing Component 1210, Channel Estimation Component 1208 and Processed Signal Generating Component 1212 may be used together to, for example, remove or decrease interference in the received signal, remove a component signal using the estimated channel from the received signal to generate a processed signal and generate or detect a residual signal in the processed signal. The Processed Signal Generating Component 1212 generates processed and/or other signals once they have been so obtained. The Processed Signal Generating Component 1212 may perform additional processing on signals such as, for example, filtering, scaling or manipulating the signals.

Interference Decreasing Component 1210 may cancel, remove or decreases strong interfering cells so that the base station 1204 can access a weaker serving cell. The cancellation, removal or decreasing of signals from interfering cells by the Interference Decreasing Component 1210 can, for example, be a function of a channel estimate or channel estimates provided to the Interference Decreasing Component 1210 by the Channel Estimation Component 1208 through channel estimation. Channel estimation, which can be useful in interference cancellation, decrease or removal, is a process, among other things, of characterizing the effect of a channel on a signal. Channel estimation can be especially helpful in reducing interference from residual signals from strong cells.

The Channel Estimation Component 1208 can employ various mechanisms/methods in order to perform a channel estimation. In accordance with one variation, for example, the Channel Estimation Component 1208 may use a detected PSS to estimate the channel. Such a channel estimation can subsequently be used to reconstruct the strong cell signals to cancel. Using the PSS for channel estimation can be beneficial because, among other reasons, the PSS is usually readily available in an initial cell search when coherent SSS detection is performed. However, the PSS can have a single frequency network (SFN) effect, particularly when there are only three PSSs in a system.

In another variation, the Channel Estimation Component 1208 may use a detected SSS to estimate the channel. There can be a large number of SSSs per system (e.g., there may be as much or more as one hundred and sixty-eight SSSs in a particular system). Because of the large number of SSSs, the SFN effect can be lower when SSSs are used to estimate the channel than when PSSs are used to estimate the channel.

In another variation, the Channel Estimation Component 1208 may perform a reference signal (RS) based channel estimate. More specifically, the user equipment 1104 can acquire a strong cell and use RS symbols corresponding to the strong cell to obtain a channel estimate. In this variation, RS symbols can be wideband and may include adjacent multiple subframes. Combining RS symbols across multiple subframes can depend upon the presence of a MBSFN or on a blank subframe.

Differences in the implementation of performing a RS based channel estimates can exist between single and multiple antenna systems. For example, in a single antenna system RS based channels can be used directly. Alternatively, for a multiple transmit antenna system, PSS/SSS may use precoding vector steering (PVS) to allow a UE to determine transmission phases and properly decode the transmission. By contrast, an RS based approach does not use PVS. In particular, a precoding vector may be linked to a system frame number (SFN) or other quantity. Further, an RS based channel estimate can be multiplied with a precoding vector to obtain the channel for PSS/SSS.

In accordance with yet another variation, the Channel Estimation Component 1208 can perform physical broadcast channel (PBCH) aided channel estimation. In this variation, the base station 1204 may decode strong cell PBCH and use the decoded strong cell PBCH to perform or enhance channel estimation. Decoded strong cell PBCH may also be used to reduce false alarm, where "reducing false alarm" means, among other things to identify whether or not an apparently detected cell truly exists or is detectable.

Differences in the implementation of performing physical broadcast channel (PBCH) aided channel estimates can exist between single and multiple antenna systems. In a single antenna system, for example, physical channel experienced by PBCH can be directly applied to PSS/SSS. For multiple antenna systems, on the other hand, the physical channel experienced by PBCH can be multiplied with a precoding vector to obtain the channel applied to PSS/SSS.

The Signal Acquisition Component 1206 can also include a Verification Component 1214 to reduce false alarms. In one variation, the Verification Component 1214 may reduce false alarms or perform verification based on a reference signal received power (RSRP) measurement. This can be done, for example, by comparing RSRP with a number of quantities. For example, the Verification Component 1214 may compare RSRP with a threshold, such as an absolute or pre-defined or defined threshold value. Verification Component 1214 may compare RSRP with a relative threshold generated from a detected strongest cell, and/or a threshold generated from an average of multiple detected cells. This variation is beneficial in that an RSRP measurement is already required, for example in Rel-8. Further, the variation method improves reliability. However, RSRP measurement/thresholding can involve or even necessitate a time average. This may result in increased search times.

According to another variation, the Verification Component 1214 can reduce false alarms or perform verification based on PBCH decoding. In this variation, for example, the presence of a cell can be confirmed by performing a cyclic redundancy check (CRC) on the residual signal. Since PBCH has a sixteen-bit CRC, this CRC can give a reliable indication of a valid cell. Additionally, detection time for the CRC is shorter than RSRP measurement and average. Generally, user equipment 1204 may need to decode PBCH for many or even all neighbor cells.

In yet another variation, the Verification Component 1214 can combine verification based on RSRP measurement with verification based on PBCH decoding. For example, PBCH can be decoded for only those cells where RSRP passes a certain threshold. Among other things, this variation results in good reliability and reduced complexity/power consumption. Moreover, RSRP does not necessarily require long average length.

Scale Component 1216 of the Signal Acquisition Component 1206 and user equipment 1204 can perform signal scaling to improve weak residual signals and/or increase their detectability. The residual signal obtained from cancelling or decreasing strong interference can be relatively weak, compared to detection capabilities. Consequently, a large bit width may be needed to handle, use or interpret the weak signal. In addition, when a system is not strictly synchronous, interpreting a weak signal can be made more difficult by the presence of data from strong cell(s), which are not easy to cancel, decrease or eliminate. In response, Scale Component 1216 can perform automatic gain control (AGC) after cancellation. AGC can be used, for example, to increase residual signal strength (e.g., to increase signal strength after interference cancellation, removal or decrease) such that the residual signal reaches similar levels as the received signal. Such scaling can be, for example, based on an estimated channel from the Channel Estimation Component 1208 and/or the energy differences between the received signal and residual signal, among other things.

Base station 1204 may also be configured to acquire signals and decrease interference when strong and weak cells have the same PSS. In this situation, errors in channel estimation may partially or effectively cancel the desired PSS. Careful planning can address this situation where all femto eNBs around a macro use a different PSS from the macros, for instance. Another option is to store information associated with the estimated channel and a detected timing to allow multiple similarly labeled estimated channels to be distinguished.

FIGS. 13-16 illustrate various methodologies and apparatuses in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 13:
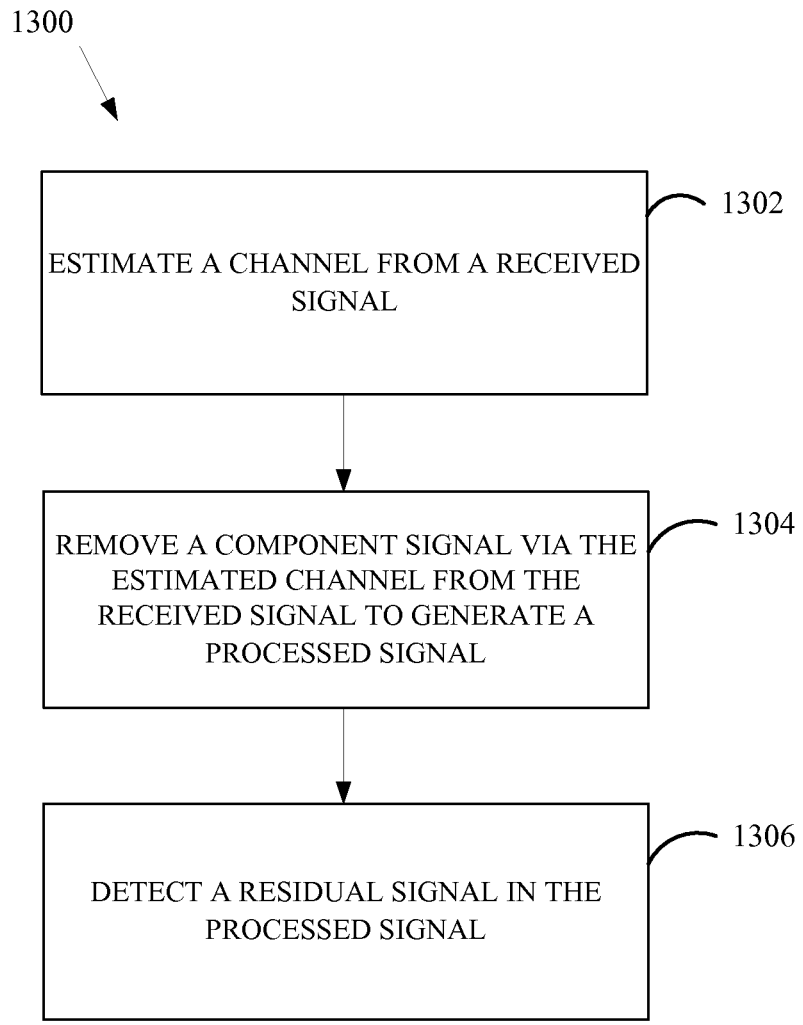
FIG. 13 is a flow chart diagram of an exemplary method of signal processing in accordance with a disclosed aspect.

Referring to FIG. 13, a system 1300 which may include a UE, a first eNB and any suitable number of additional eNBs or UEs. Further, in operation in the system 1300, either the UE or the eNB may decrease or cancel interference.

At reference numeral 1302, a UE or eNB may estimate a channel from a received signal using one or more channel estimation schemes. The received signal may include components from a plurality of cells. At reference numeral 1304, the UE or eNB may remove a component signal using the estimated channel from the received signal to generate a processed signal. At reference numeral 1306, the UE or eNB may detect a residual signal in the processed signal.

In one aspect, the UE or eNB may further detect a primary sync signal in the received signal and generate a channel estimate using the primary sync signal.

In yet another aspect, the UE or eNB may further detect a secondary sync signal in the received signal and generate a channel estimate using the secondary sync signal.

In another aspect, the UE or eNB may further obtain a reference signal and generate a channel estimate using the reference signal. The UE or eNB may further detect a signal from a first cell, wherein the signal from the first cell includes the reference signal with reference signal symbols and obtain the estimated channel using the reference signal symbols. The reference signal symbols may be included in the reference signal across multiple subframes. The reference signal symbols may also be included in the reference signal in either a multimedia broadcast single frequency network (MBSFN) subframe or a blank subframe. In this aspect, the UE or eNB may further detect the reference symbols directly using a single antenna system or detect primary and second sync signals using precoding vector steering, or detect the reference symbols directly in a multiple antenna system. In one aspect, the UE or eNB may further estimate the channel from the reference symbols in a single antenna system and combine with at least one of channel estimates from primary or secondary sync signals.

In another aspect, the UE or eNB may further estimate the channel from the reference symbols in a multiple antenna system and combine with at least one of channel estimates from primary or secondary signals using precoding vector steering. The UE or eNB may further link a precoding vector used in the primary and secondary sync signals with a cell ID and a system frame number.

In one aspect, one of the one or more channel estimation schemes includes decoding a first cell physical broadcast channel and applying the decoded first cell physical broadcast channel to primary sync signals and secondary sync signals associated with the received signal. In this aspect, the UE or eNB may further multiply the physical broadcast channel with a precoding vector to obtain a channel to apply to the primary sync signals and the secondary sync signals. The UE or eNB may further link a precoding vector used in the primary and secondary sync signals with a cell ID and a system frame number.

In one aspect, the UE or eNB may further apply one or more false alarm reduction schemes. One of the one or more false alarm reduction schemes may include comparing a received power of the residual signal with a threshold value. The threshold value may include at least one of a defined threshold value, a threshold generated from a detected strongest cell or a threshold generated from an average of multiple detected cells. In one aspect, the UE or eNB may further perform a cyclic redundancy check on the detected signal. In another aspect, the UE or eNB may further determine a reference signal received power is higher than a threshold in the residual signal and decode a physical broadcast channel from the residual signal.

In one aspect, automatic gain control may be performed on the residual signal. In this aspect, the UE or eNB may further apply a scaling factor to the residual signal based on at least one of the estimated channel or an energy difference between the received signal and the residual signal. The UE or eNB may further determine that the residual signal and a signal associated with the estimated channel have similar transmitted primary sync signals and storing information associated with the estimated channel and a detected timing, wherein the stored information further may include detected primary sync signals.

Figure 14:
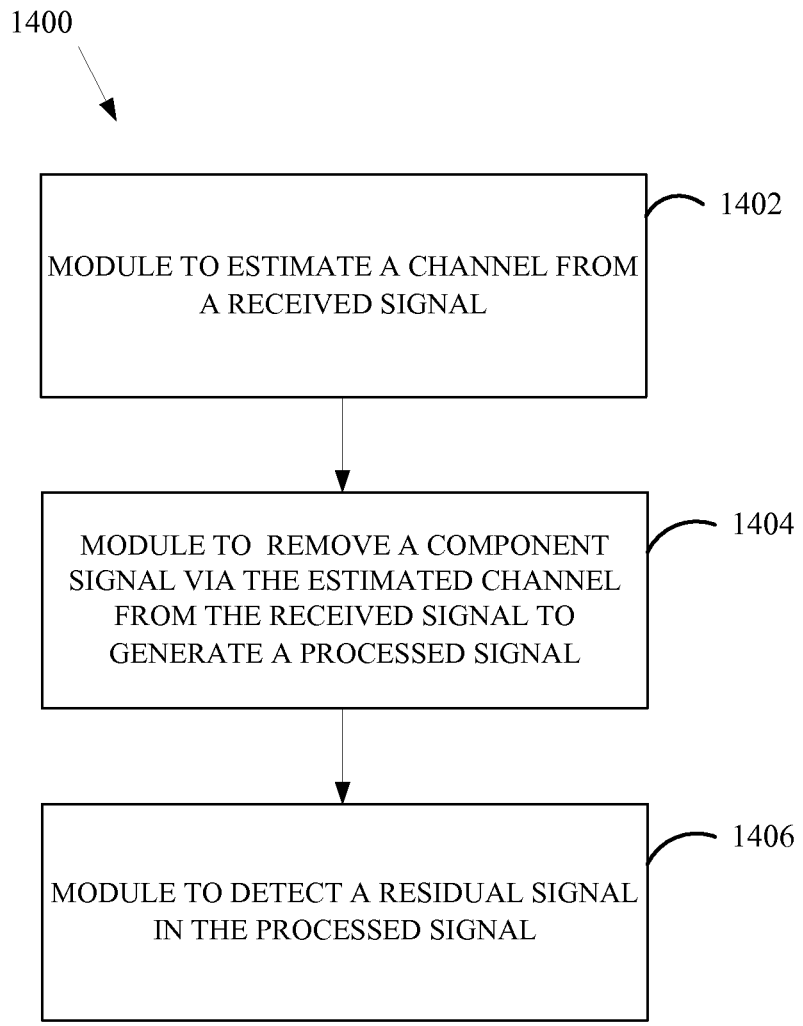
FIG. 14 is a conceptual block diagram illustrating the functionality of an exemplary apparatus.

FIG. 14 is a conceptual block diagram illustrating the functionality of an exemplary apparatus 1400. Referring to FIG. 14, a system 1400 may include a first UE, a first eNB and any suitable number of additional eNBs or UEs. Further, in operation in the system 1400, the UE or the eNB may decrease or cancel interference.

The apparatus 1400 includes a module 1402 that may estimate a channel from a received signal in a received signal using one or more channel estimation schemes. The apparatus 1400 also includes a module 1404 that may remove the estimated channel from the received signal to generate a processed signal. The received signal may include components from a plurality of cells. Further, the apparatus 1400 includes a module 1406 that may detect a residual signal in the processed signal.

In one aspect, the module 1402 may detect a primary sync signal in the received signal and generating a channel estimate using the primary sync signal. In another aspect, the module 1402 may detect secondary sync signal in the received signal and generating a channel estimate using the secondary sync signal.

In yet another aspect, the module 1402 may obtain the reference signal and generate a channel estimate using the reference signal. In this aspect, the module 1402 may further detect a signal from a first cell, wherein the signal from the first cell includes the reference signal with reference signal symbols and obtain the estimated channel using the reference signal symbols. In this aspect, the reference signal symbols may be included in the reference signal across multiple subframes. In this aspect, the reference signal symbols may also be included in the reference signal in either a MBSFN subframe or a blank subframe. In this aspect, the module 1402 may further detect the reference symbols directly using a single antenna system or detect primary and second sync signals using precoding vector steering, or detecting the reference symbols directly in a multiple antenna system.

In another aspect, module 1404 may decode a first cell physical broadcast channel, and apply the decoded first cell physical broadcast channel to primary sync signals and secondary sync signals associated with the received signal. In this aspect, module 1404 may further multiply the physical broadcast channel with a precoding vector to obtain a channel to apply to the primary sync signals and the secondary sync signals.

In one aspect, the module 1406 may detect a residual signal in the processed signal. In another aspect, the module 1406 may apply one or more false alarm reduction schemes. In this aspect, module 1406 may compare a received power of the reference signal with a threshold value. In this aspect, the threshold value may include at least one of a defined threshold value, a threshold generated from a detected strongest cell, or a threshold generated from an average of multiple detected cells. In one aspect, module 1406 may perform a cyclic redundancy check on the residual signal. In another aspect, module 1406 may perform a cyclic redundancy check on the residual signal.

In one aspect, module 1406 may perform automatic gain control on the residual signal. In this aspect, module 1406 may apply a scaling factor to the residual signal based on at least one of the estimated channel, or an energy difference between the received signal and the residual signal. In one aspect, it may be determined that the residual signal and a signal associated with the estimated channel have the same primary sync signals and information associated with the estimated channel and a detected timing may be stored.

Figure 15:
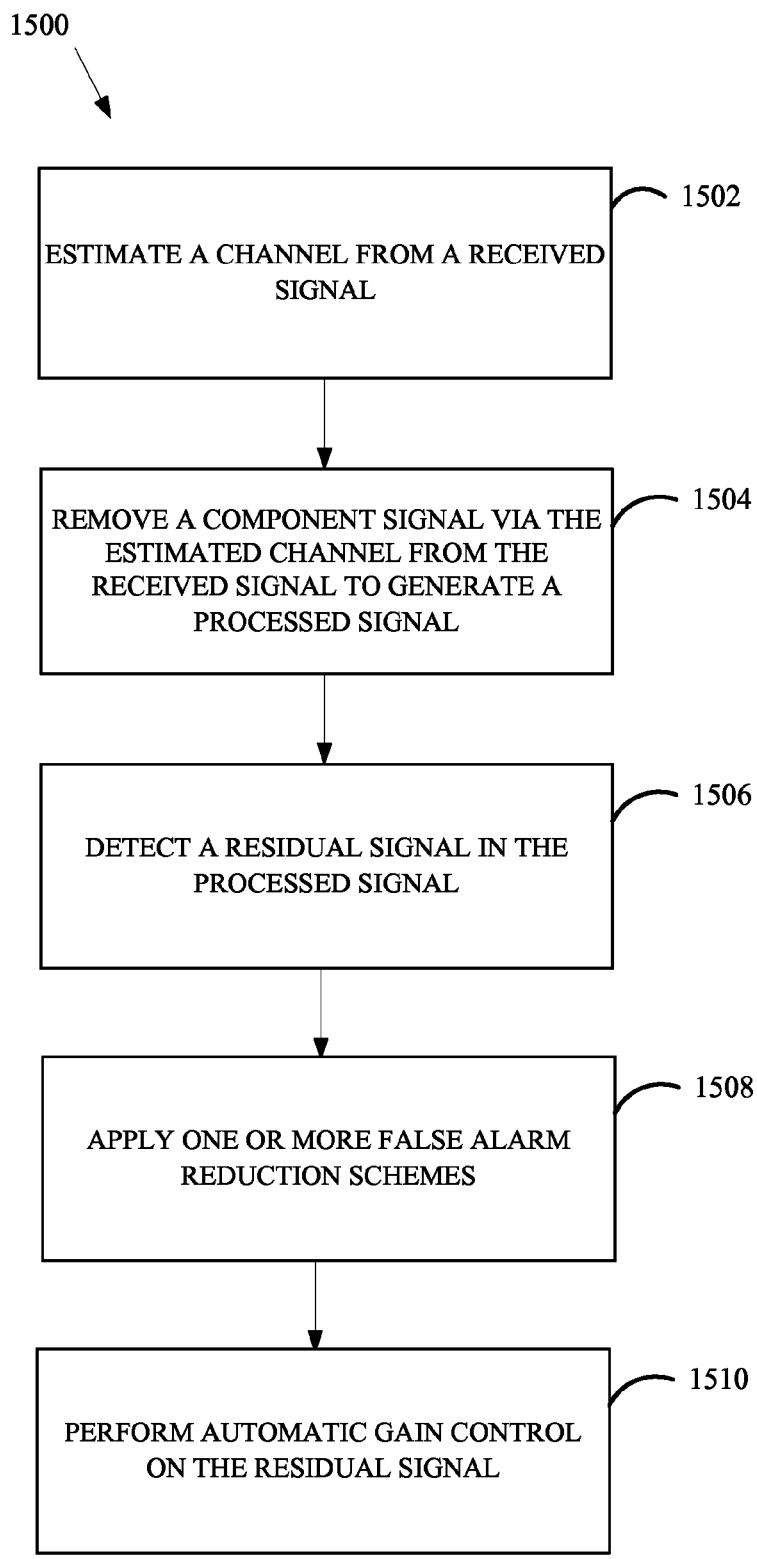
FIG. 15 is a flow chart diagram of an exemplary method of signal processing in accordance with a disclosed aspect.

Referring to FIG. 15, a system 1500 which may include a UE, a first eNB and any suitable number of additional eNBs or UEs. Further, in operation in the system 1500, either the UE or the eNB may decrease or cancel interference.

At reference numeral 1502, a UE or eNB may estimate a channel from a received signal in a received signal using one or more channel estimation schemes. At reference numeral 1504, the UE or eNB may remove the estimated channel from the received signal to generate a processed signal. The received signal may include components from a plurality of cells. At reference numeral 1506, the UE or eNB may detect a residual signal in the processed signal. At reference numeral 1508, the UE or eNB may apply one or more false alarm reduction schemes. At reference numeral 1510, the UE or eNB may perform automatic gain control on the residual signal.

In one aspect, the UE or eNB may further detect a primary sync signal in the received signal and generating a channel estimate using the primary sync signal. In another aspect, the UE or eNB may further detect secondary sync signal in the received signal and generating a channel estimate using the secondary sync signal.

In yet another aspect, the UE or eNB may further obtain the reference signal and generate a channel estimate using the reference signal. In this aspect, the UE or eNB detect a signal from a first cell, wherein the signal from the first cell includes the reference signal with reference signal symbols and obtain the estimated channel using the reference signal symbols. In this aspect, the reference signal symbols may be included in the reference signal across multiple subframes. In this aspect, the reference signal symbols may also be included in the reference signal in either a MBSFN subframe or a blank subframe. In this aspect, the UE or eNB may either detect the reference symbols directly using a single antenna system or detect primary and second sync signals using precoding vector steering, or detect the reference symbols directly in a multiple antenna system.

In another aspect, the UE or eNB may decode a first cell physical broadcast channel, and apply the decoded first cell physical broadcast channel to primary sync signals and secondary sync signals associated with the received signal. In this aspect, the UE or eNB may multiply the physical broadcast channel with a precoding vector to obtain a channel to apply to the primary sync signals and the secondary sync signals.

In one aspect, the UE or eNB may compare a received power of the reference signal with a threshold value. In this aspect, the threshold value may include at least one of a defined threshold value, a threshold generated from a detected strongest cell, or a threshold generated from an average of multiple detected cells. In one aspect, one of the one or more false alarm reduction schemes may include performing a cyclic redundancy check on the residual signal. In another aspect, the UE or eNB may perform a cyclic redundancy check on the residual signal.

In one aspect, the UE or eNB may perform automatic gain control and apply a scaling factor to the residual signal based on at least one of the estimated channel, or an energy difference between the received signal and the residual signal. In one aspect, it may be determined that the residual signal and a signal associated with the estimated channel have the same primary sync signals and information associated with the estimated channel and a detected timing may be stored.

Figure 16:
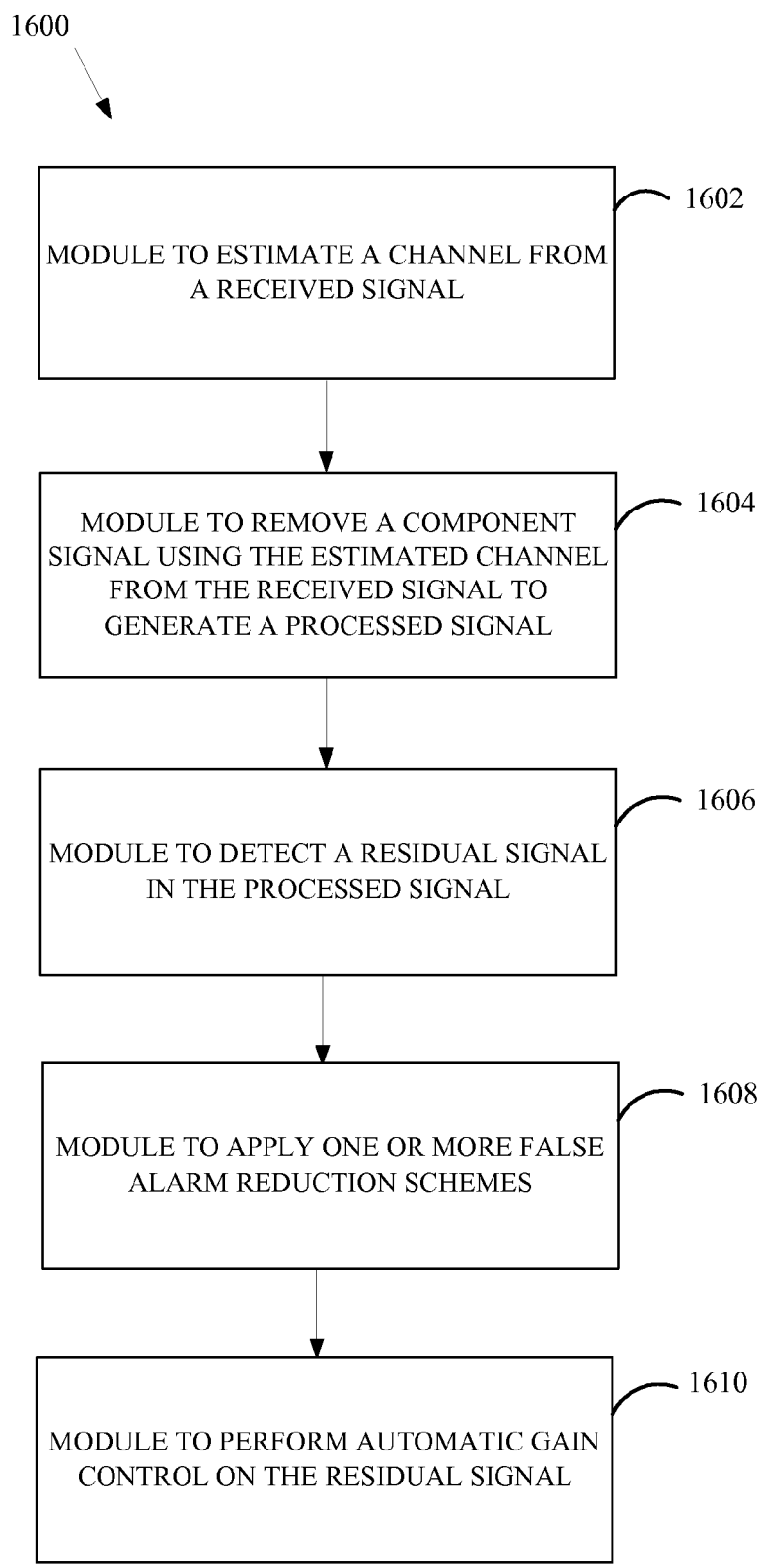
FIG. 16 is a conceptual block diagram illustrating the functionality of an exemplary apparatus.

FIG. 16 is a conceptual block diagram illustrating the functionality of an exemplary apparatus 1600. Referring to FIG. 16, a system 1600 may include a first UE, a first eNB and any suitable number of additional eNBs or UEs. Further, in operation in the system 1600, the UE or the eNB may decrease or cancel interference.

The apparatus 1600 includes a module 1602 that may estimate a channel from a received signal in a received signal using one or more channel estimation schemes. The apparatus 1600 includes a module 1604 that may remove the estimated channel from the received signal to generate a processed signal. The received signal may include components from a plurality of cells. The apparatus 1600 includes a module 1606 that may detect a residual signal in the processed signal. The apparatus 1600 includes a module 1608 that may apply one or more false alarm reduction schemes. The apparatus 1600 includes a module 1610 that may perform automatic gain control on the residual signal.

In one aspect, the module 1602 may detect a primary sync signal in the received signal and generating a channel estimate using the primary sync signal. In another aspect, the module 1602 may detect secondary sync signal in the received signal and generating a channel estimate using the secondary sync signal.

In yet another aspect, the module 1602 may obtain the reference signal and generate a channel estimate using the reference signal. In this aspect, the module 1602 may further detect a signal from a first cell, wherein the signal from the first cell includes the reference signal with reference signal symbols and obtain the estimated channel using the reference signal symbols. In this aspect, the reference signal symbols may be included in the reference signal across multiple subframes. In this aspect, the reference signal symbols may also be included in the reference signal in either a MBSFN subframe or a blank subframe. In this aspect, the module 1602 may further detect the reference symbols directly using a single antenna system or detect primary and second sync signals using precoding vector steering, or detecting the reference symbols directly in a multiple antenna system.

In another aspect, module 1604 may decode a first cell physical broadcast channel, and apply the decoded first cell physical broadcast channel to primary sync signals and secondary sync signals associated with the received signal. In this aspect, module 1604 may further multiply the physical broadcast channel with a precoding vector to obtain a channel to apply to the primary sync signals and the secondary sync signals.

In one aspect, the module 1606 may detect a residual signal in the processed signal. In another aspect, the module 1608 may apply one or more false alarm reduction schemes. In this aspect, module 1608 may compare a received power of the reference signal with a threshold value. In this aspect, the threshold value may include at least one of a defined threshold value, a threshold generated from a detected strongest cell, or a threshold generated from an average of multiple detected cells. In one aspect, module 1604 may perform a cyclic redundancy check on the residual signal. In another aspect, module 1604 may perform a cyclic redundancy check on the residual signal.

In one aspect, module 1610 may perform automatic gain control on the residual signal. In this aspect, module 1610 may apply a scaling factor to the residual signal based on at least one of the estimated channel, or an energy difference between the received signal and the residual signal. In one aspect, it may be determined that the residual signal and a signal associated with the estimated channel have the same primary sync signals and information associated with the estimated channel and a detected timing may be stored.

Referring to FIG. 1 and FIG. 7, in one configuration, the apparatus 100 for wireless communication may include a means for estimating a channel from the received signal using one or more channel estimation schemes, a means for removing a component signal using the estimated channel from the received signal to generate a processed signal, and a means for detecting a residual signal in the processed signal. In one configuration, the means for estimating may further include means for detecting a primary sync signal in the received signal, and means for generating a channel estimate using the primary sync signal. In one configuration, means for estimating may further include means for detecting a secondary sync signal in the received signal, and means for generating a channel estimate using the secondary sync signal. In another configuration, the means for estimating may further include a means for obtaining a reference signal, and a means for generating a channel estimate using the reference signal.

In one configuration, the means for obtaining may further include a means for detecting a signal from a first cell, wherein the signal from the first cell includes the reference signal with reference signal symbols, and a means for obtaining the estimated channel using the reference signal symbols. In this configuration, the reference signal symbols may be included in the reference signal across multiple subframes. The reference signal symbols may alternatively be included in the reference signal in either a MBSFN subframe or a blank subframe. In one configuration, the means for obtaining the estimated channel using the reference signal symbols further includes means for estimating the channel from the reference symbols in a single antenna system and means for combining with at least one of channel estimates from primary or secondary sync signals. In another configuration, the means for obtaining the estimated channel using the reference signal symbols further includes a means for estimating the channel from the reference symbols in a multiple antenna system and a means for combining with at least one of channel estimates from primary or secondary signals using precoding vector steering. In this configuration, the means for linking a precoding vector used in the primary and secondary sync signals with a cell ID and a system frame number may be further included.

In one configuration, the apparatus 100 includes means for estimating a channel from the received signal using one or more channel estimation schemes may include a means for decoding a first cell physical broadcast channel, and a means for applying the decoded first cell physical broadcast channel to primary sync signals and secondary sync signals associated with the received signal. In this configuration, the means for applying may further include means for multiplying the physical broadcast channel with a precoding vector to obtain a channel to apply to the primary sync signals and the secondary sync signals. In this configuration, a means for linking a precoding vector used in the primary and secondary sync signals with a cell ID and a system frame number may be further included. In one configuration, the apparatus 100 includes means for detecting may further include a means for applying one or more false alarm reduction schemes. In this configuration, the means for applying one of the one or more false alarm reduction schemes may include a means for comparing a received power of the residual signal with a threshold value. In this configuration, the threshold value may include at least one of a defined threshold value, a threshold generated from a detected strongest cell, or a threshold generated from an average of multiple detected cells. In one configuration, the apparatus 100 includes means for applying one of the one or more false alarm reduction schemes may include a means for performing a cyclic redundancy check on the detected signal. In another configuration, the apparatus 100 includes means for applying one of the one or more false alarm reduction schemes may include a means for determining a reference signal received power is higher than a threshold in the residual signal, and a means for decoding a physical broadcast channel from the residual signal.

In one configuration, apparatus 100 includes means for performing automatic gain control on the residual signal may be included. In this configuration, the means for performing automatic gain control may further include means for applying a scaling factor to the residual signal based on at least one of the estimated channel or an energy difference between the received signal and the residual signal.

In one configuration, the apparatus 100 includes means for determining that the residual signal and a signal associated with the estimated channel have similar transmitted primary sync signals, and means for storing information associated with the estimated channel and a detected timing, wherein the stored information may further include detected primary sync signals.

The aforementioned means is the processing system 114 configured to perform the functions recited by the aforementioned means. As described supra, the processing system 114 includes the TX Processor 716, the RX Processor 770, and the controller/processor 775. As such, in one configuration, the aforementioned means may be the TX Processor 716, the RX Processor 770, and the controller/processor 775 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   estimating a channel from a received signal using one or more channel estimation schemes;
   removing a component signal, associated with a first base station, using the estimated channel from the received signal to generate a processed signal;
   applying one or more false alarm reduction schemes on the processed signal, the processed signal comprising a component signal from a second base station, the component signal from the second base station being weaker than the component signal associated with the first base station; and
   detecting a residual signal in the processed signal based on the applied one or more false alarm reduction schemes, the residual signal including signaling associated with the second base station,
   wherein one of the one or more false alarm reduction schemes comprises verifying an existence of the second base station by:
      determining that a reference signal received power in the residual signal is higher than a threshold, the reference signal received power being associated with the second station, and
      confirming the existence of the second base station by performing a cyclic redundancy check of a physical broadcast channel in response to determining the reference signal received power is higher than the threshold, the physical broadcast channel being associated with the second base station.

2. The method of claim 1, wherein the received signal comprises components from a plurality of cells.

3. The method of claim 1, wherein the estimating further comprises:
   detecting a primary synchronization signal in the received signal; and
   generating a channel estimate using the primary synchronization signal.

4. The method of claim 1, wherein the estimating further comprises:
   obtaining a reference signal; and
   generating a channel estimate using the reference signal.

5. The method of claim 4, wherein the obtaining further comprises:
   detecting a signal from a first cell, wherein the signal from the first cell includes the reference signal with reference signal symbols; and
   obtaining the estimated channel using the reference signal symbols.

6. The method of claim 5, wherein the reference signal symbols are included in the reference signal across multiple subframes.

7. The method of claim 5, wherein the reference signal symbols are included in the reference signal in either a multimedia broadcast single frequency network (MBSFN) subframe or a blank subframe.

8. The method of claim 5, wherein the obtaining the estimated channel using the reference signal symbols further comprises estimating the channel from the reference symbols in a single antenna system and combining with at least one of channel estimates from primary or secondary synchronization signals.

9. The method of claim 5, wherein the obtaining the estimated channel using the reference signal symbols further comprises estimating the channel from the reference symbols in a multiple antenna system and combining with at least one of channel estimates from primary or secondary signals using precoding vector steering.

10. The method of claim 9, further comprising linking a precoding vector used in the primary and secondary synchronization signals with a cell ID and a system frame number.

11. The method of claim 1, wherein one of the one or more channel estimation schemes comprises:
    decoding a first cell physical broadcast channel; and
    applying the decoded first cell physical broadcast channel to primary synchronization signals and secondary synchronization signals associated with the received signal.

12. The method of claim 11, wherein the applying further comprises multiplying the physical broadcast channel with a precoding vector to obtain a channel to apply to the primary synchronization signals and the secondary synchronization signals.

13. The method of claim 11, further comprising linking a precoding vector used in the primary and secondary synchronization signals with a cell ID and a system frame number.

14. The method claim 1, wherein one of the one or more false alarm reduction schemes comprises comparing a received power of the residual signal with a threshold value.

15. The method of claim 14, wherein the threshold value comprises at least one of:
    a defined threshold value;
    a threshold generated from a detected strongest cell; or
    a threshold generated from an average of multiple detected cells.

16. The method of claim 1, further comprising performing automatic gain control on the residual signal.

17. The method of claim 16, wherein the automatic gain control further comprises applying a scaling factor to the residual signal based on at least one of:
    the estimated channel; or
    an energy difference between the received signal and the residual signal.

18. The method of claim 1, further comprising:
    determining that the residual signal and a signal associated with the estimated channel have similar transmitted primary synchronization signals; and
    storing information associated with the estimated channel and a detected timing, wherein the stored information further comprises detected primary synchronization signals.

19. The method of claim 1,
wherein the received signal includes a primary synchronization signal and a secondary synchronization signal for facilitating cell detection, and
wherein the estimating comprises:
detecting the secondary synchronization signal in the received signal; and
generating a channel estimate using the secondary synchronization signal.

20. The method of claim 1,
wherein the one of the one or more false alarm reduction schemes further comprises determining that a received power of the physical broadcast channel, associated with the second base station, is higher than another threshold; and
wherein the decoding is further performed in response to determining the physical broadcast channel received power is higher than the other threshold.

21. The method of claim 1, wherein the one or more false alarm reduction schemes is performed for a plurality of cells.

22. An apparatus for wireless communication, comprising:
means for estimating a channel from a received signal using one or more channel estimation schemes;
means for removing a component signal, associated with a first base station, using the estimated channel from the received signal to generate a processed signal; and
means for applying one or more false alarm reduction schemes on the processed signal, the processed signal comprising a component signal from a second base station, the component signal from the second base station being weaker than the component signal associated with the first base station;
means for detecting a residual signal in the processed signal based on the applied one or more false alarm reduction schemes, the residual signal including signaling associated with the second base station,
wherein one of the one or more false alarm reduction schemes comprises verifying an existence of the second base station by:
determining that a reference signal received power in the residual signal is higher than a threshold, the reference signal received power being associated with the second base station, and
confirming the existence of the second base station by performing a cyclic redundancy check of a physical broadcast channel in response to determining the reference signal received power is higher than the threshold, the physical broadcast channel being associated with the second base station.

23. The apparatus of claim 22, wherein the received signal comprises components from a plurality of cells.

24. The apparatus of claim 22, wherein the means for estimating further comprises:
means for detecting a primary synchronization signal in the received signal; and
means for generating a channel estimate using the primary synchronization signal.

25. The apparatus of claim 22, wherein the means for estimating further comprises:
means for obtaining a reference signal; and
means for generating a channel estimate using the reference signal.

26. The apparatus of claim 25, wherein the means for obtaining further comprises:
means for detecting a signal from a first cell, wherein the signal from the first cell includes the reference signal with reference signal symbols; and
means for obtaining the estimated channel using the reference signal symbols.

27. The apparatus of claim 26, wherein the reference signal symbols are included in the reference signal across multiple subframes.

28. The apparatus of claim 26, wherein the reference signal symbols are included in the reference signal in either a multimedia broadcast single frequency network (MBSFN) subframe or a blank subframe.

29. The apparatus of claim 26, wherein the means for obtaining the estimated channel using the reference signal symbols further comprises means for estimating the channel from the reference symbols in a single antenna system and means for combining with at least one of channel estimates from primary or secondary synchronization signals.

30. The apparatus of claim 26, wherein the means for obtaining the estimated channel using the reference signal symbols further comprises means for estimating the channel from the reference symbols in a multiple antenna system and means for combining with at least one of channel estimates from primary or secondary signals using precoding vector steering.

31. The apparatus of claim 30, further comprising means for linking a precoding vector used in the primary and secondary synchronization signals with a cell ID and a system frame number.

32. The apparatus of claim 22, wherein the means for estimating a channel from the received signal using one or more channel estimation schemes comprises:
means for decoding a first cell physical broadcast channel; and
means for applying the decoded first cell physical broadcast channel to primary synchronization signals and secondary synchronization signals associated with the received signal.

33. The apparatus of claim 32, wherein the means for applying further comprises means for multiplying the physical broadcast channel with a precoding vector to obtain a channel to apply to the primary synchronization signals and the secondary synchronization signals.

34. The apparatus of claim 32, further comprising means for linking a precoding vector used in the primary and secondary synchronization signals with a cell ID and a system frame number.

35. The apparatus of claim 22, wherein the means for applying the one or more false alarm reduction schemes comprises means for comparing a received power of the residual signal with a threshold value.

36. The apparatus of claim 35, wherein the threshold value comprises at least one of:
a defined threshold value;
a threshold generated from a detected strongest cell; or
a threshold generated from an average of multiple detected cells.

37. The apparatus of claim 22, further comprising means for performing automatic gain control on the residual signal.

38. The apparatus of claim 37, wherein the means for performing automatic gain control further comprises means for applying a scaling factor to the residual signal based on at least one of:
the estimated channel; or
an energy difference between the received signal and the residual signal.

39. The apparatus of claim 22, further comprising:
means for determining that the residual signal and a signal associated with the estimated channel have similar transmitted primary synchronization signals; and means for storing information associated with the estimated channel and a detected timing, wherein the stored information further comprises detected primary synchronization signals.

40. The apparatus of claim 22,
wherein the received signal includes a primary synchronization signal and a secondary synchronization signal for facilitating cell detection, and
wherein the means for estimating comprises:
means for detecting the secondary synchronization signal in the received signal; and
means for generating a channel estimate using the secondary synchronization signal.

41. The apparatus of claim 22, wherein the means for applying one or more false alarm reduction schemes is configured to perform the one or more false alarm reduction schemes for a plurality of cells.

42. A non-transitory computer-readable medium storing computer executable code for wireless communication, comprising code for:
estimating a channel from a received signal using one or more channel estimation schemes;
removing a component signal, associated with a first base station, using the estimated channel from the received signal to generate a processed signal;
applying one or more false alarm reduction schemes on the processed signal, the processed signal comprising a component signal from a second base station, the component signal from the second base station being weaker than the component signal associated with the first base station; and
detecting a residual signal in the processed signal based on the applied one or more false alarm reduction schemes, the residual signal including signaling associated with the second base station,
wherein one of the one or more false alarm reduction schemes comprises verifying an existence of the second base station by:
determining that a reference signal received power in the residual signal is higher than a threshold, the reference signal received power being associated with the second base station, and
confirming the existence of the second base station by performing a cyclic redundancy check of a physical broadcast channel in response to determining the reference signal received power is higher than the threshold, the physical broadcast channel being associated with the second base station.

43. The computer-readable medium of claim 42, wherein the received signal comprises components from a plurality of cells.

44. The computer-readable medium of claim 42, wherein the code for estimating further comprises code for:
detecting a primary synchronization signal in the received signal; and
generating a channel estimate using the primary synchronization signal.

45. The computer-readable medium of claim 42, wherein one of the one or more channel estimation schemes comprise code for:
decoding a first cell physical broadcast channel; and
applying the decoded first cell physical broadcast channel to primary synchronization signals and secondary synchronization signals associated with the received signal.

46. The computer-readable medium of claim 42, wherein one of the one or more false alarm reduction schemes comprises code for comparing a received power of the residual signal with a threshold value.

47. The computer-readable medium of claim 42, wherein the non-transitory computer-readable medium further comprises code for:
determining that the residual signal and a signal associated with the estimated channel have similar transmitted primary synchronization signals; and
storing information associated with the estimated channel and a detected timing, wherein the stored information further comprises detected primary synchronization signals.

48. The computer-readable medium of claim 42, further comprising code for performing automatic gain control on the residual signal.

49. The computer-readable medium of claim 42,
wherein the received signal includes a primary synchronization signal and a secondary synchronization signal for facilitating cell detection, and
wherein the code for estimating comprises code for:
detecting the secondary synchronization signal in the received signal; and
generating a channel estimate using the secondary synchronization signal.

50. The computer-readable of claim 42, wherein the code for applying one or more false alarm reduction schemes is configured to perform the one or more false alarm reduction schemes for a plurality of cells.

51. An apparatus for wireless communication, comprising:
at least one processor; and
a memory coupled to the at least one processor, wherein the at least one processor is configured to:
estimate a channel from a received signal using one or more channel estimation schemes;
remove a component signal, associated with a first base station, using the estimated channel from the received signal to generate a processed signal;
apply one or more false alarm reduction schemes on the processed signal, the processed signal comprising a component signal from a second base station, the component signal from the second base station being weaker than the component signal associated with the first base station; and
detect a residual signal in the processed signal based on the applied one or more false alarm reduction schemes, the residual signal including signaling associated with the second base station,
wherein to apply one of the one or more false alarm reduction schemes the at least one processor is further configured to verify an existence of the second base station by:
determine that a reference signal received power in the residual signal is higher than a threshold, the reference signal received power being associated with the second base station, and
confirming the existence of the second base station by performing a cyclic redundancy check of a physical broadcast channel in response to determining the reference signal received power is higher than the threshold, the physical broadcast channel being associated with the second base station.

52. The apparatus of claim 51, wherein the received signal comprises components from a plurality of cells.

53. The apparatus of claim 51, wherein to estimate a channel from the received signal using one or more channel estimation schemes the at least one processor is further configured to:
   detect a primary synchronization signal in the received signal; and
   generate a channel estimate using the primary synchronization signal.

54. The apparatus of claim 51, wherein to estimate a channel from the received signal using one or more channel estimation schemes, the at least one processor is further configured to:
   decode a first cell physical broadcast channel; and
   apply the decoded first cell physical broadcast channel to primary synchronization signals and secondary synchronization signals associated with the received signal.

55. The apparatus of claim 51, wherein to apply one of the one or more false alarm reduction schemes the at least one processor is further configured to compare a received power of the residual signal with a threshold value.

56. The apparatus of claim 51, wherein the at least one processor is further configured to:
   determine that the residual signal and a signal associated with the estimated channel have similar transmitted primary synchronization signals; and
   store information associated with the estimated channel and a detected timing, wherein the stored information further comprises detected primary synchronization signals.

57. The apparatus of claim 51, wherein the at least one processor is further configured to perform automatic gain control on the residual signal.

58. The apparatus of claim 51,
   wherein the received signal includes a primary synchronization signal and a secondary synchronization signal for facilitating cell detection, and
   wherein to estimate a channel from the received signal using one or more channel estimation schemes the at least one processor is further configured to:
   detect the secondary synchronization signal in the received signal; and
   generate a channel estimate using the secondary synchronization signal.

59. The apparatus of claim 51, wherein the at least one processor is further configured to apply one or more false alarm reduction schemes by performing the one or more false alarm reduction schemes for a plurality of cells.

\* \* \* \* \*